(12) United States Patent
Seyama

(10) Patent No.: US 9,369,309 B2
(45) Date of Patent: Jun. 14, 2016

(54) RECEIVING APPARATUS, METHOD FOR RECEIVING, AND WIRELESS COMMUNICATION SYSTEM

(71) Applicant: FUJITSU LIMITED, Kawaski-shi, Kanagawa (JP)

(72) Inventor: Takashi Seyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 8 days.

(21) Appl. No.: 14/669,324

(22) Filed: Mar. 26, 2015

(65) Prior Publication Data
US 2015/0304131 A1 Oct. 22, 2015

(30) Foreign Application Priority Data
Apr. 17, 2014 (JP) ................ 2014-085512

(51) Int. Cl.
| H04B 1/10 | (2006.01) |
| H04L 25/02 | (2006.01) |
| H04L 25/03 | (2006.01) |
| H04L 27/26 | (2006.01) |

(52) U.S. Cl.
CPC ........ *H04L 25/0202* (2013.01); *H04L 25/0224* (2013.01); *H04L 25/03006* (2013.01); *H04L 27/2647* (2013.01); *H04L 2025/03414* (2013.01)

(58) Field of Classification Search
CPC .............. H04L 25/03038; H04L 27/2647; H04L 2025/03414; H04L 25/03057; H04B 1/1036
USPC ................. 375/259–285, 316–352
See application file for complete search history.

(56) References Cited

U.S. PATENT DOCUMENTS

| 8,385,478 B1* | 2/2013 | Liu ............... H04L 25/0204 370/252 |
| 2004/0131007 A1* | 7/2004 | Smee et al. ............ 370/208 |
| 2006/0007904 A1 | 1/2006 | Shimomura et al. |
| 2007/0110196 A1* | 5/2007 | McCloud et al. ......... 375/348 |
| 2010/0029213 A1 | 2/2010 | Wang |
| 2010/0323625 A1* | 12/2010 | Kishigami ......... H04B 7/0434 455/65 |
| 2010/0325510 A1* | 12/2010 | Nogami ............. H04B 1/7107 714/750 |
| 2011/0007729 A1* | 1/2011 | Nogami ............. H04J 11/004 370/342 |

(Continued)

FOREIGN PATENT DOCUMENTS

| JP | 2006-5664 | 1/2006 |
| JP | 2011-30249 | 2/2011 |

(Continued)

OTHER PUBLICATIONS

J. C. Henao et al; "Advanced receiver signal processing techniques: evaluation and characterization", Advanced Radio Interface Technologies for 4G Systems—ARTIST4G; Document Indentifier D2.2; Jan. 21, 2011; pp. 1-125; source: URL:https://ict-artist4g.eu/project/work-packages/wp2/deliverables/d2.2/final/d2.2-1/at_download/file [searched on Mar. 30, 2014].

Baojin Li et al; "Interference Cancellation for HetNet Deployment in 3GPP LTE-Advanced Rel-11"; Proceeding IEEE Vehicular Technology Conference; IEEE; pp. 1-5; Jun. 2013.

*Primary Examiner* — James M Perez
(74) *Attorney, Agent, or Firm* — Fujitsu Patent Center

(57) ABSTRACT

A receiving apparatus includes an estimator that estimates a channel of a known signal received in the receiving apparatus, and a controller that controls a weight value based on the result of the estimating, the weight value being to be multiplied by a replica signal of the known signal.

8 Claims, 16 Drawing Sheets

(56) References Cited

U.S. PATENT DOCUMENTS

| | | | |
|---|---|---|---|
| 2011/0044158 A1* | 2/2011 | Tao | H04B 7/15564 370/201 |
| 2011/0075770 A1 | 3/2011 | Seyama | |
| 2011/0286346 A1 | 11/2011 | Barbieri et al. | |
| 2012/0063532 A1* | 3/2012 | Yoshimoto | H04J 11/004 375/285 |
| 2012/0113973 A1* | 5/2012 | Kim | H04L 25/0202 370/342 |
| 2012/0300738 A1 | 11/2012 | Palanki et al. | |
| 2015/0109944 A1* | 4/2015 | Koike | H04J 11/005 370/252 |

FOREIGN PATENT DOCUMENTS

| | | |
|---|---|---|
| JP | 2011-77940 | 4/2011 |
| JP | 2011-530247 | 12/2011 |
| JP | 2012-529786 | 11/2012 |
| JP | 2013-98941 | 5/2013 |
| JP | 2013-524736 | 6/2013 |

* cited by examiner

RECEIVING APPARATUS, METHOD FOR RECEIVING, AND WIRELESS COMMUNICATION SYSTEM

CROSS-REFERENCE TO RELATED APPLICATION

This application is based upon and claims the benefit of priority of the prior Japanese Patent application No. 2014-085512, filed on Apr. 17, 2014, the entire contents of which are incorporated herein by reference.

FIELD

The embodiments discussed herein are a receiving apparatus, a method for receiving, and a wireless communication system.

BACKGROUND

A wireless communication system including a base station and a mobile station has been known (see, for example, Patent Literatures 1-4 and Non-Patent Literatures 1 and 2). The mobile station includes a receiving apparatus that receives a wireless signal from the base station. The base station includes a receiving apparatus that receives a wireless signal from the mobile station. The mobile station wirelessly communicates with the base station in a wireless area that the base station forms.

For example, LTE Release 10 prescribed by 3GPP proposes a scheme, called eICIC, of controlling interference between cells. Here, the term 3GPP is an abbreviation for Third Generation Partnership Project; the term LTE is an abbreviation for Long Term Evolution; and the term eICIC is an abbreviation for Enhanced Inter-Cell Interference Coordination.

For example, the eICIC is assumed to be carried out in cases where, as illustrated in FIG. 1, the pico base station 92 forms a picocell C2 inside the macrocell C1 formed by a macro base station 91. In this case, a wireless signal that a mobile station 93 positioned in the picocell C2 receives from the pico base station 92 is largely interfered by a wireless signal transmitted in the macrocell C1. Hereinafter, a wireless signal that a mobile station 93 positioned in the picocell C2 receives from the pico base station 92 is referred to as a desired signal while a wireless signal transmitted in the picocell C1 is referred to as an interfering wave.

Considering the above, as illustrated in FIG. 2, eICIC sets a time period P1 to transmit an Almost Blank Subframe (ABS) in the macrocell C1 and transmits data to the mobile station 93 in the picocell during the time period P1.

An ABS includes a reference signal (e.g., a CRS), a synchronization signal (e.g., a PSS and an SSS), and broadcast information. The term CRS is an abbreviation for Cell-Specific Reference Signal; the term PSS is an abbreviation for Primary Synchronization Signal; and the term SSS is an abbreviation for Secondary Synchronization Signal. For example, broadcast information is transmitted through a Physical Broadcast Channel (PBCH). An ABS is a subframe in which data is not allocated to a wireless resource different from a wireless resource allocated thereto a reference signal, a synchronization signal, and broadcast information.

This can suppress influence of an interfering wave on the reception quality of the mobile terminal 93 during the time period P1, so that the reception quality of the mobile terminal 93 can be enhanced. Consequently, a region in which the picocell C2 accommodates the mobile terminal 93 can be expanded. This expansion is also called Cell Range Expansion (CRE).

Here, a reference signal, a synchronization signal, and broadcast information included in an ABS degrade the reception quality of the mobile station 93. To solve this disadvantage, the LTE Release 11 prescribed by 3GPP proposes the scheme of Further Enhanced ICIC (feICIC).

The scheme of feICIC notifies a mobile station of information of an interfering cell, which transmits a wireless signal that causes an interfering wave. Information related to an interfering cell is also referred to as CRS Assistance Information. Besides, the feICIC cancels a reference signal, a synchronization signal, and broadcast information included in an ABS, which is transmitted in a macrocell, in a reception process performed by a mobile station. Thereby, the reception quality of the mobile station can be improved, so that the region in which the picocell can accommodate a mobile terminal can be expanded.

A receiving apparatus that cancels a reference signal, a synchronization signal, and broadcast information from the ABS transmitted in the macrocell is also called an Interference Canceling (IC) receiving apparatus. Cancelling a reference signal, a synchronization signal, and broadcast information are called CRS-IC, PSS/SSS-IC, and PBCH-IC, respectively.

Here, the overview of CRS-IC will now be described as an example. A received signal for the l-th symbol time of the k-th subcarrier in OFDM is expressed by Expression 1. The term OFDM is an abbreviation for Orthogonal Frequency-Division Multiplexing. The l-th symbol time is a time corresponding to the l-th OFDM symbol along the time axis.

$$y(k, l) = H(k, l)V(k, l)x(k, l) + \sum_{i=1}^{N_{cell}} H_i(k, l)x_i^{(CRS)}(k, l) + n(k, l)$$

[Expression 1]

Here, the term $y(k, l)$ represents a received signal and is a $N_r \times 1$ vector. The term $N_r$ represents the number of receiving antennas that the mobile station uses. The term $H(k, l)$ represents a channel between the base station and the mobile station in a serving cell, and is an $N_r \times N_t$ matrix. A serving cell is a wireless area accommodating the mobile station. The term $N_t$ represents the number of transmitting antennas that the base station uses in the serving cell.

The term $V(k, l)$ represents an $N_t \times N_{stream}$ transmitting precoding matrix in the serving cell. The term $N_{stream}$ represents the number of streams contained in a desired signal. A desired signal is a wireless signal that the base station transmits to the mobile station in the serving cell and is also referred to as a transmitted signal. The term $x(k, l)$ represents the desired signal and is an $N_{stream} \times 1$ vector.

The term $N_{cell}$ represents the number of interfering cells, which are wireless areas different from the serving cell. The term $H_i(k, l)$ represents a channel between the base station and a mobile station in an i-th interfering cell and is an $N_r \times N_{t,i}$ matrix. The term $N_{t,i}$ represents the number of transmitting antennas that the base station uses in the i-th interfering cell. The term $x_i^{(CRS)}(k, l)$ represents a CRS transmitted in the i-th interfering cell and is an $N_{t,i} \times 1$ vector. The term $n(k, l)$ represents Additive White Gaussian Noise (AWGN) and is an $N_r \times 1$ vector.

A mobile station estimates the channel $H_{e,i}$ between the base station and a mobile station in the i-th interfering cell. A channel between the base station and a mobile station in an interfering cell is called an interfering channel. As denoted in Expression 2, the mobile station cancels a component derived from a reference signal transmitted in an interfering cell from the received signal y by subtracting a signal obtained by multiplying the reference signal $x_i^{(CRS)}$ by the estimated interfering channel $H_{e,i}$ from the received signal y. The signal obtained by multiplying the reference signal $x_i^{(CRS)}$ by the estimated interfering channel $H_{e,i}$ is also referred to as the replica signal of a reference signal.

$$y_{PC}(k, l) = y(k, l) - \sum_{i=1}^{N_{cell}} H_{e,i}(k, l) x_i^{(CRS)}(k, l) \quad \text{[Expression 2]}$$

The term $y_{PC}$ represents a signal obtained by canceling a component derived from a reference signal transmitted in an interfering cell from a received signal.

The mobile station carries out a reception process on the basis of the received signal $y_{PC}$ after undergoing the canceling. Examples of the reception process are estimation of a channel in the serving cell, demodulation of the received signal, and error correction decoding on the received signal.

[Patent Literature 1] Japanese Laid-open Patent Publication No. 2013-98941
[Patent Literature 2] Japanese National Publication of International Patent Application No. 2012-529786
[Patent Literature 3] Japanese National Publication of International Patent Application No. 2013-524736
[Patent Literature 4] Japanese National Publication of International Patent Application No. 2011-530247
[Non-Patent Literature 1] Baojin Li and two other persons, "Interference Cancellation for HetNet Deployment in 3GPP LTE-Advanced Rel-11", Proceeding IEEE Vehicular Technology Conference, IEEE, p. 1-5, June 2013
[Non-Patent Literature 2] J. C. Henao and 15 other persons, "Advanced receiver signal processing techniques: evaluation and characterization", Advanced Radio Interface Technologies for 4G Systems, [searched on Mar. 30, 2014], Internet, <URL:https://ict-artist4g.eu/projet/work-packages/wp2/deliverables/d2.2/final/d2.2-1/at download/file>

SUMMARY

As one of the aspects, there is provided a receiving apparatus including: an estimator that estimates a channel of a known signal received in the receiving apparatus; and a controller that controls a weight value based on the result of the estimating, the weight value being to be multiplied by a replica signal of the known signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Figure 1:
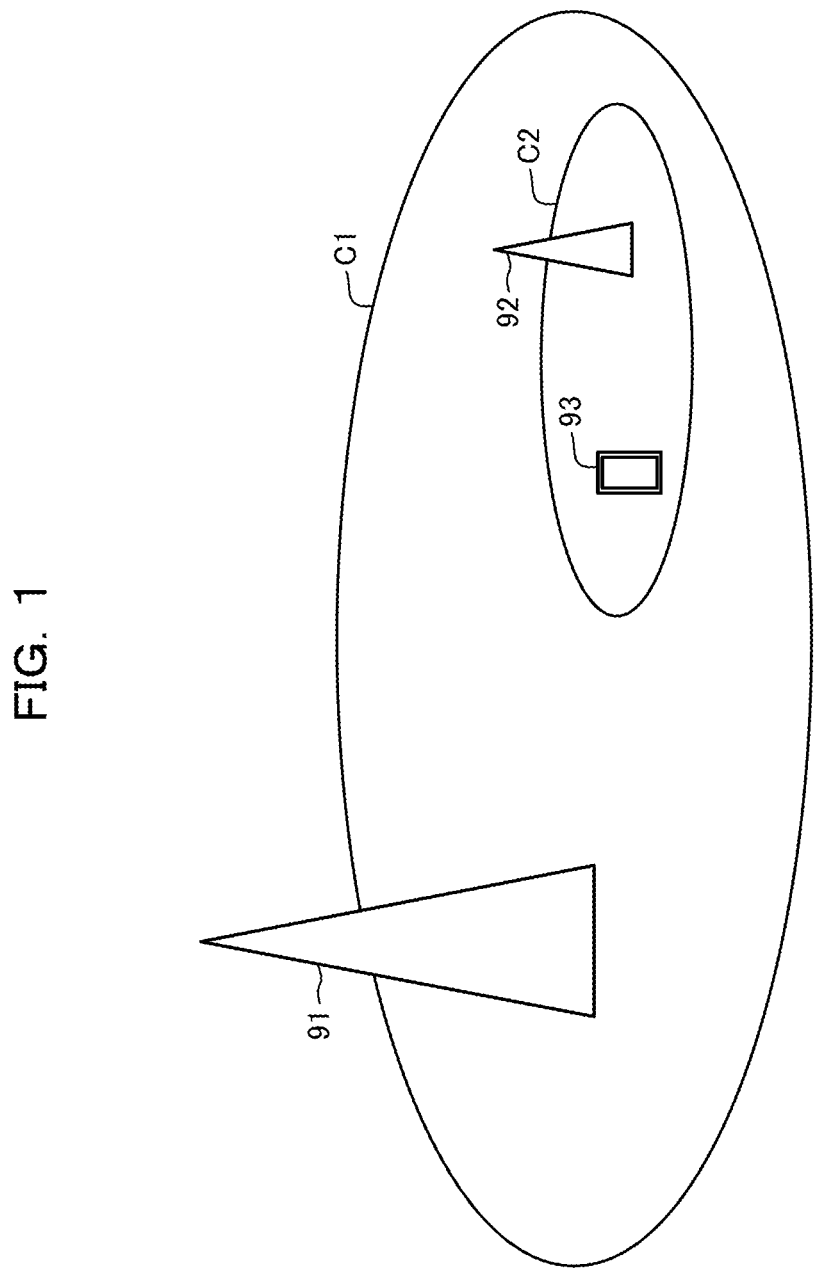
FIG. 1 is a diagram illustrating an example of a wireless communication system.
Figure 2:
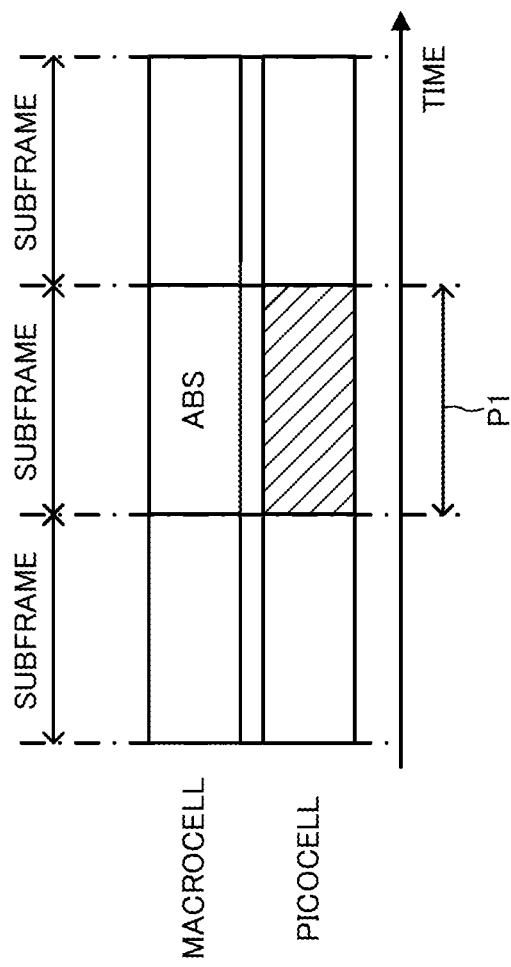
FIG. 2 is a diagram illustrating an example of eICIC.

The estimated value of an interfering channel includes an estimation error. When a mobile station estimates an interfering channel, the estimation error comes to be larger as the reception intensity of a wireless signal transmitted in an interfering cell comes to be smaller as compared with the reception intensity of a wireless signal transmitted in the serving cell.

For example, fading due to Doppler effect and frequency selectivity fading tends to reduce the reception intensity of a wireless signal transmitted in an interfering cell. Further, for example, when a mobile cell positioned in the picocell, functioning as the serving cell, moves from the edge to the center of the picocell, the reception intensity of a wireless signal transmitted in the serving cell tends to increase. In these cases, since the reception intensity of a wireless signal transmitted in an interfering cell comes to be smaller relatively to the reception intensity of a wireless signal transmitted in the serving cell, the estimation error included in the estimated value of the interfering channel tends to increase.

The presence of estimation error in the estimated value of the interfering channel sometimes makes it impossible to cancel a component derived from a reference signal transmitted in an interfering cell from the received signal with sufficiently high precision. A larger estimation error tends to leave a component derived from a reference signal transmitted in an interfering cell in the received signal even after the canceling.

Here, for facilitating the description, there is assumed a case including a single interfering cell, a single transmitting antenna, and a single receiving antenna. Under this assumption, a received signal is expressed by Expression 3.

$$y = hx + h_1 x_1^{(CRS)} + n \quad \text{[Expression 3]}$$

As denoted in following Expression 4, the estimated value $h_{e,1}$ of an interfering channel is expressed by the sum of a true value $h_1$ of the interfering channel and the estimation error m.

$$h_{e,1} = h_1 + m \quad \text{[Expression 4]}$$

Accordingly, a signal obtained by subtracting the replica signal $h_{e,1} x_1^{(CRS)}$ from the received signal y is expressed by Expression 5.

$$y - h_{e,1} x_1^{(CRS)} = hx + h_1 x_1^{(CRS)} + n - (h_1 + m) x_1^{(CRS)} \quad \text{[Expression 5]}$$
$$= hx - m x_1^{(CRS)} + n$$

As denoted in Expression 5, the component $m x_1^{(CRS)}$ derived from the reference signal $x_1^{(CRS)}$ transmitted in the interfering cell remains in the signal obtained by subtracting the replica signal $h_{e,1} x_1^{(CRS)}$ from the received signal y. Consequently, the quality of the wireless communication tends to degrade.

Except for the reference signal, another known signal also tends to degrade the quality of the wireless communication likewise the reference signal. An example of the known signal is a synchronization signal known to both the base station and the mobile station beforehand. Likewise the canceling a component derived from a reference signal transmitted in the interfering cell from the received signal, canceling a component derived from a reference signal transmitted in the serving cell from the received signal also tends to degrade the quality of the wireless communication.

Hereinafter, embodiments of the present disclosure will now be described with reference to the accompanying drawings. The following embodiments are exemplary, so there is no intention to exclude application of various modifications and techniques not suggested in the following description to the embodiments. Throughout accompanying drawings of the embodiments, like reference numbers designate the same or substantially identical parts and elements unless otherwise specified.

First Embodiment

Configuration

Figure 3:
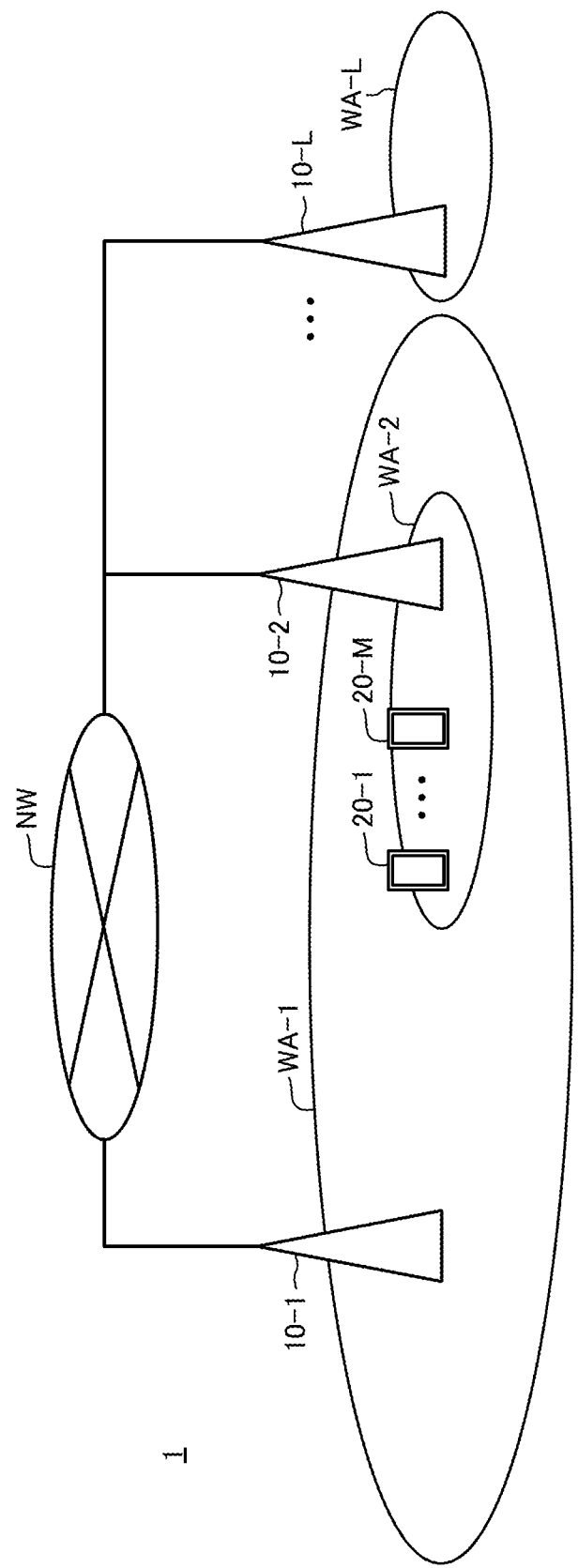
FIG. 3 is a block diagram illustrating an example of the configuration of a wireless communication system according to a first embodiment.

As illustrated in FIG. 3, a wireless communication system 1 according to a first embodiment includes L base stations 10-1, ..., 10-L and M mobile stations 20-1, ..., 20-M. The symbol L represents an integer equal to or more than two and the symbol M represents an integer equal to or more than one.

Hereinafter, when not discriminating a base station 10-u from the remaining base stations, the base station 10-u may be simply represented by the base station 10. Here, the symbol u represents an integer between 1 and L. Likewise, when not discriminating a mobile station 20-v from the remaining mobile stations, the mobile station 20-v may be simply represented by the mobile station 20. The symbol v represents an integer between 1 and M.

A base station 10 is an example of a transmitting apparatus while the mobile station 20 is an example of a receiving apparatus.

In this embodiment, the description assumes that each base station 10 includes a single transmitting antenna and each mobile station 20 includes a single receiving antenna. Alternatively, each base station 10 may include two or more transmitting antennas and each mobile station 20 may include two or more receiving antennas.

The wireless communication system 1 carries out wireless communication between the base stations 10 and the mobile stations 20 in a certain wireless communication scheme. Examples of the wireless communication scheme is Long Term Evolution (LTE), LTE-Advanced, and Worldwide Interoperability for Microwave Access (WiMAX).

In this embodiment, the base station 10-u forms a wireless area WA-u. When not discriminating the wireless area WA-u from the remaining wireless areas, the wireless area WA-u may be represented by the wireless area WA. Each bases station 10 may form multiple wireless areas WA. A wireless area WA may be also referred to as a coverage area or a communication region. Examples of a wireless area WA are a macrocell, a microcell, a nanocell, a picocell, a femtocell, a home cell, and a sector cell. Each base station 10 wirelessly communicates with a mobile station 20 being positioned in the wireless area WA that the relevant base station 10 forms.

Specifically, each base station 10 provides a wireless resource in the wireless area WA that the base station 10 forms. For example, the wireless resource is identified by a time and a frequency. Each base station 10 communicates with a mobile station 20 being positioned in the wireless area WA that the base station 10 forms by using the wireless resource that the base station 10 provides in the relevant wireless area WA. Examples of a base station 10 are an access point, an Evolved Node B (eNB), a Node B (NB), a femto base station, a macro base station, and a home base station.

In this embodiment, the base station 10-1 has the maximum value of transmitting power of a wireless signal larger than that of the base station 10-2. This means that the base station 10-1 can form a wireless area WA-1 wider than the wireless area WA-2 that the base station 10-2 forms. In this embodiment, the base station 10-1 is also referred to as a macro base station and the base station 10-2 is also referred to as a micro base station.

In this embodiment, the micro base station 10-2 is arranged in the wireless area WA-1 that the macro base station 10-1 forms and the wireless area WA-2 that the micro base station 10-2 forms is positioned in the wireless area WA-1 that the macro base station 10-1 forms. The wireless area WA-1 is an example of a first wireless area and is also referred to as a macrocell. The wireless area WA-2 is an example of a second wireless area and is also called a microcell.

In the first embodiment, the mobile stations 20-1, ..., 20-M are positioned in the wireless area WA-2 that the micro base station 10-2 forms.

In the first embodiment, each base station 10 is wired-communicably connected to a communication network (e.g., core network) NW via a communication line. Alternatively, each base station 10 may be wirelessly-communicably connected to the communication network NW. An interface between each base station 10 and the communication network NW may be called an S1 interface. An interface between the base stations 10 may be called an X2 interface.

A part of the wireless communication system 1 including entities closer to the communication network (in other words, the part having an upper level) than the base stations 10 may be referred to as an EPC, which is an abbreviation for Evolved Packet Core. A part of the wireless communication system 1 formed by the base stations 10 may be referred to as an E-UTRAN, which is an abbreviation for Evolved Universal Terrestrial Radio Access Network.

A mobile station 20 wirelessly communicates with a base station 10 that forms the wireless area WA, in which the mobile station 20 is positioned, using the wireless resource provided in the wireless area WA. A mobile station 20 may also be called a wireless terminal, a terminal device, and user equipment (UE).

In this embodiment, a wireless area WA accommodating a mobile station 20 is also called a serving cell. For example, accommodating a mobile station 20 by a wireless area WA means that the mobile station 20 is connected to the base station 10 that forms the wireless area WA such that the mobile station 20 can send and receive data to and from the base station 10 using the wireless resource provided in the wireless area WA.

In this embodiment, a wireless area WA except for the wireless area WA accommodating a mobile station 20 is also called an interfering cell.

In this embodiment, a wireless signal transmitted from the base station 10 in the serving cell is a desired signal destined for a mobile station 20 accommodated in the serving cell. In this embodiment, a wireless signal transmitted from the base station 10 in the interfering cell is an interfering wave on the mobile station 20 accommodated in the serving cell.

(Configuration: Base Station)

Figure 4:
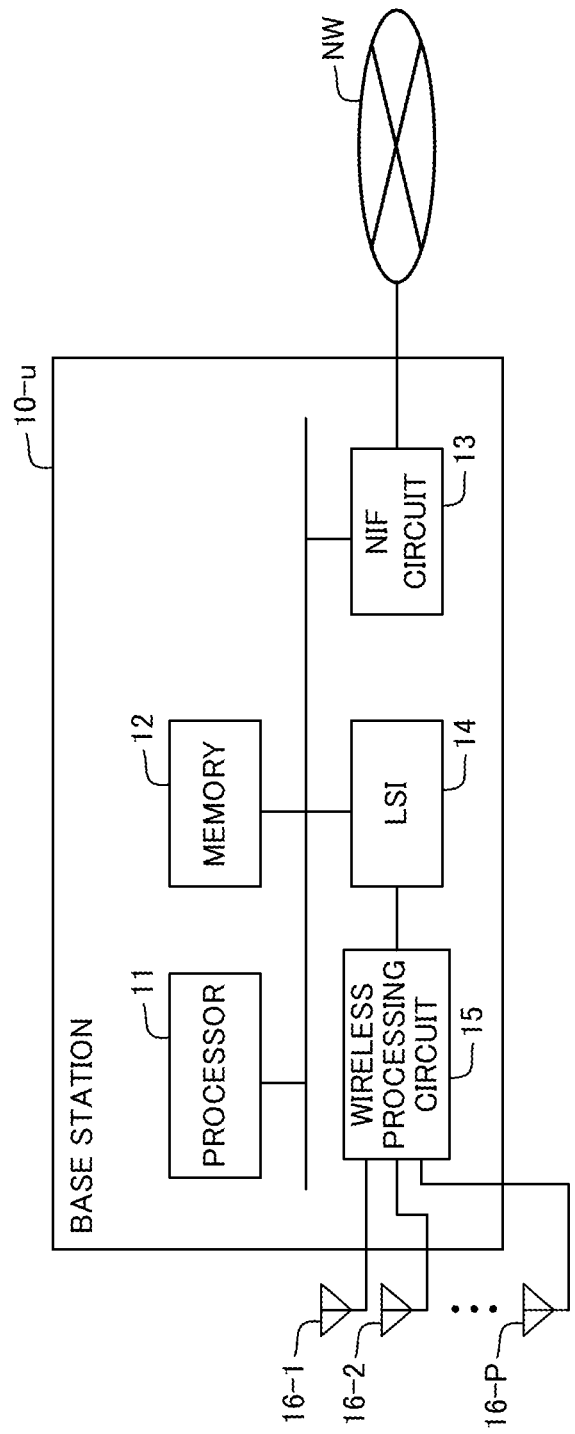
FIG. 4 is a block diagram illustrating an example of the configuration of a base station of FIG. 3.

As illustrated in FIG. 4, a base station 10-*u* exemplarily includes a processor 11, a memory 12, an NIF circuit 13, an LSI 14, a wireless processing circuit 15, and P antennas 16-1, . . . , 16-P. In this embodiment, the symbol P represents an integer equal to or more than two. The term NIF is an abbreviation for Network Interface and the term LSI is an abbreviation for Large Scale Integration.

The processor 11 controls the operation of the base station 10-*u* by executing a program stored in the memory 12.

The NIF circuit 13 receives data that is to be transmitted to a mobile station 20 from the communication network NW and transmits data received from a mobile station 20 to the communication network NW. In addition, the NIF circuit 13 sends and receives control information to and from the communication network NW. For example, the control information may include information to identify another base station 10 that forms a wireless area WA different from the local wireless area WA-u that the relevant base station 10-*u*.

The LSI 14 processes a digital signal for accomplishing wireless communication. The LSI 14 may be replaced by a programmable logical circuit device such as a Programmable Logic Device (PLD) or a Field-Programmable Gate Array (FPGA).

The wireless processing circuit 15 carries out wireless communication through the antennas 16-1, . . . , 16-P.

The detailed functions of the LSI 14 and the wireless processing circuit 15 will be described below.

(Configuration: Mobile Station)

Figure 5:
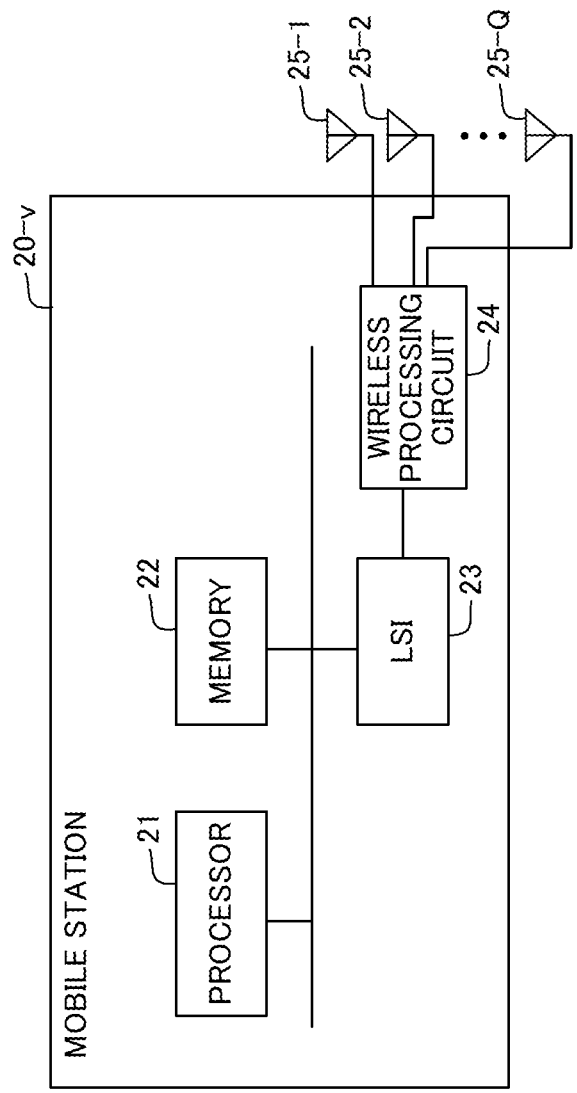
FIG. 5 is a block diagram illustrating an example of the configuration of a mobile station of FIG. 3.

As illustrated in FIG. 5, a mobile station 20-*v* exemplarily includes a processor 21, a memory 22, an LSI 23, a wireless processing circuit 24, and Q antennas 25-1, . . . , 25-Q. In this example, the symbol Q represents an integer equal to or more than two.

The processor 21 controls the operation of the mobile station 20-*v* by executing a program stored in the memory 22.

The LSI 23 processes a digital signal for accomplishing wireless communication. The LSI 23 may be replaced by a programmable logical circuit device such as a PLD or an FPGA.

The wireless processing circuit 24 carries out wireless communication through the antennas 25-1, . . . , 25-Q.

The detailed functions of the LSI 23 and the wireless processing circuit 24 will be detailed below.

(Function: Base Station)

Figure 6:
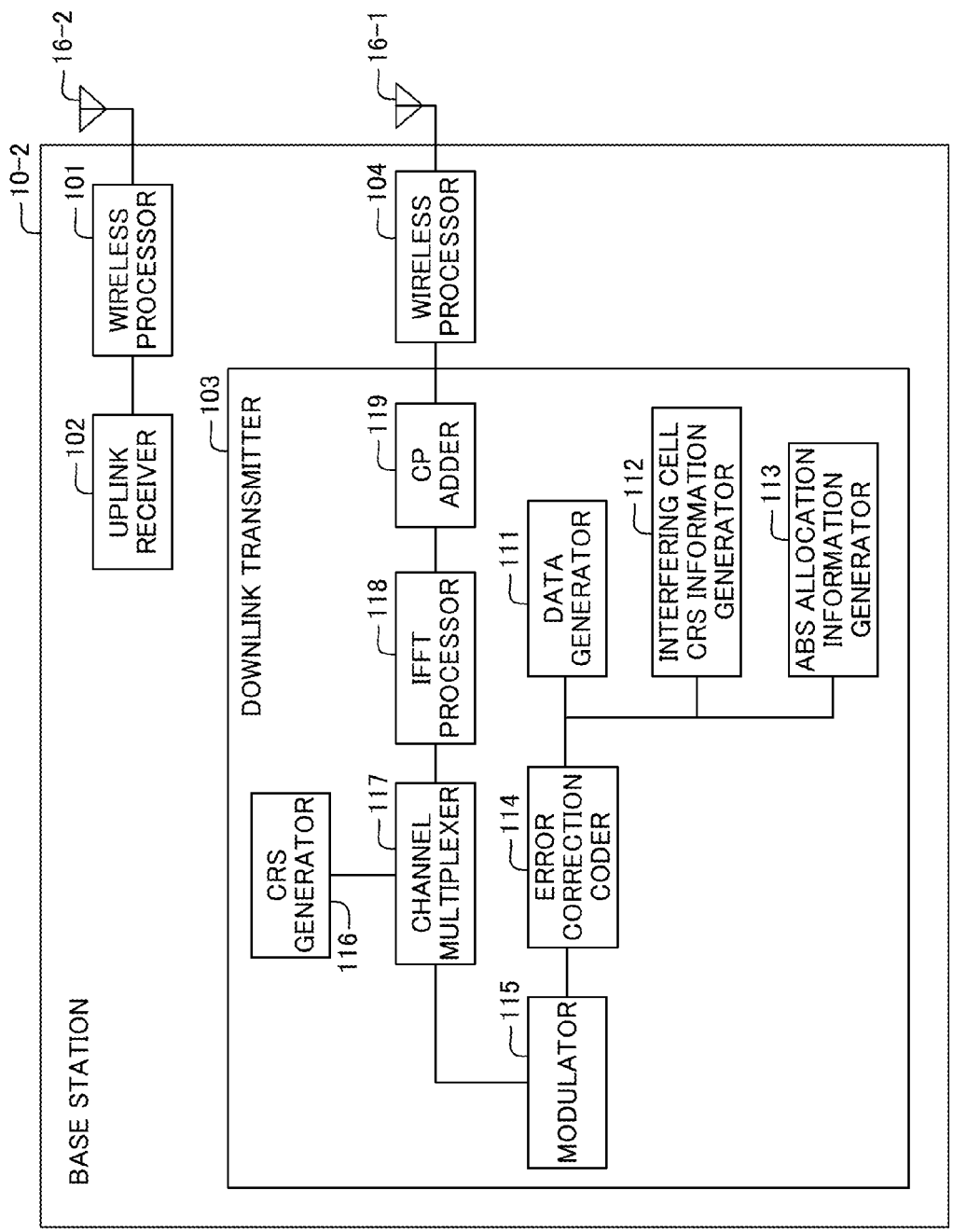
FIG. 6 is a diagram illustrating an example of the function of a micro base station of FIG. 3.

As illustrated in FIG. 6, the functions of the LSI 14 and the wireless processing circuit 15 of the micro base station 10-2 exemplarily include a wireless processor 101, an uplink receiver 102, a downlink transmitter 103, and a wireless processor 104. The wireless processor 104 serves as an example of a transmitter.

In this embodiment, the wireless processor 101 receives wireless signals through a single antenna 16-2. Alternatively, the wireless processor 101 may receive wireless signals through multiple antennas 16-2, . . . , 16-P.

The wireless processor 101 carries out frequency conversion (here down-conversion) from a wireless frequency band to a baseband on a wireless signal received through the antenna 16-2, and then performs Analog to Digital (A/D) conversion on the signal obtained by the frequency conversion.

The uplink receiver 102 processes the signal output from the wireless processor 101. The process performed by the uplink receiver 102 includes, for example, demodulation and error correction decoding.

In the above manner, the wireless processor 101 and uplink receiver 102 receive an uplink signal transmitted from the mobile station 20.

The downlink transmitter 103 exemplarily includes a data generator 111, the interfering cell CRS information generator 112, an ABS allocation information generator 113, an error correction coder 114, a modulator 115, a CRS generator 116, a channel multiplexer 117, an IFFT processor 118, and a CP adder 119. The term IFFT is an abbreviation for Inverse Fast Fourier Transform; and the term CP is an abbreviation for Cyclic Prefix.

The data generator 111 generates data destined for a mobile station 20.

The interfering cell CRS information generator 112 generates interfering cell CRS information, which includes a cell ID that identifies the interfering cell, the number of transmitting antennas that the interfering cell uses, and MBSFN subframe allocation information in this embodiment. The term MBSFN is an abbreviation for Multicast-Broadcast Single-Frequency Network.

The MBSFN subframe allocation information includes information to identify a subframe to be allocated to the MBSFN. In this embodiment, in the subframe allocated to the MBSFN, a CRS is allocated to the front symbol time but a CRS is not allocated to any symbol times subsequent to the front symbol time.

The micro base station 10-2 may retain the interfering cell CRS information beforehand or may receive the interfering cell CRS information from a controlling station or another base station 10 connected to the communication network NW.

The ABS allocation information generator 113 generates the ABS allocation information, which includes information to identify a subframe allocated to the ABS in the wireless area WA-1.

The micro base station 10-2 may retain the ABS allocation information beforehand or may receive the ABS allocation information from a controlling station or another base station 10 connected to the communication network NW.

The ABS allocation information and the interfering cell CRS information may be transmitted as, for example, RRC information, to the mobile station 20. The term RCC is an abbreviation for Radio Resource Control.

The error correction coder 114 carries out error correction coding (encoding) on the data generated by the data generator 111, the interfering cell CRS information generated by the interfering cell CRS information generator 112, and the ABS allocation information generated by the ABS allocation information generator 113. An example of an error correction code used by the error correction coder 112 is a Turbo code. Alternatively, the error correction code may be a Reed-Solomon code or a convolutional code.

The modulator 115 modulates data obtained by the coding in the error correction coder 114. The modulating here is carried out in conformity with, for example, a multi-value modulation scheme such as Quadriphase Phase-Shift Keying (QPSK), 16 Quadrature Amplitude Modulation (QAM), and 64QAM. In this embodiment, the modulator 115 outputs a modulation symbol as the data obtained by the modulating.

The CRS generator 116 generates a reference signal (CRS) that can recognize a cell and that is an example of a known signal. In this example, the base stations 10 and the mobile stations 20 know the reference signal beforehand. For example, the base stations 10 and the mobile stations 20 may retain the reference signal in advance, or may generate the reference signal.

The channel multiplexer 117 multiplexes data destined for a mobile station 20 and a reference signal. In this embodiment, the channel multiplexer 117 multiplexes data modulated by the modulator 115 and the CRS generated by the CRS generator 116.

Figure 7:
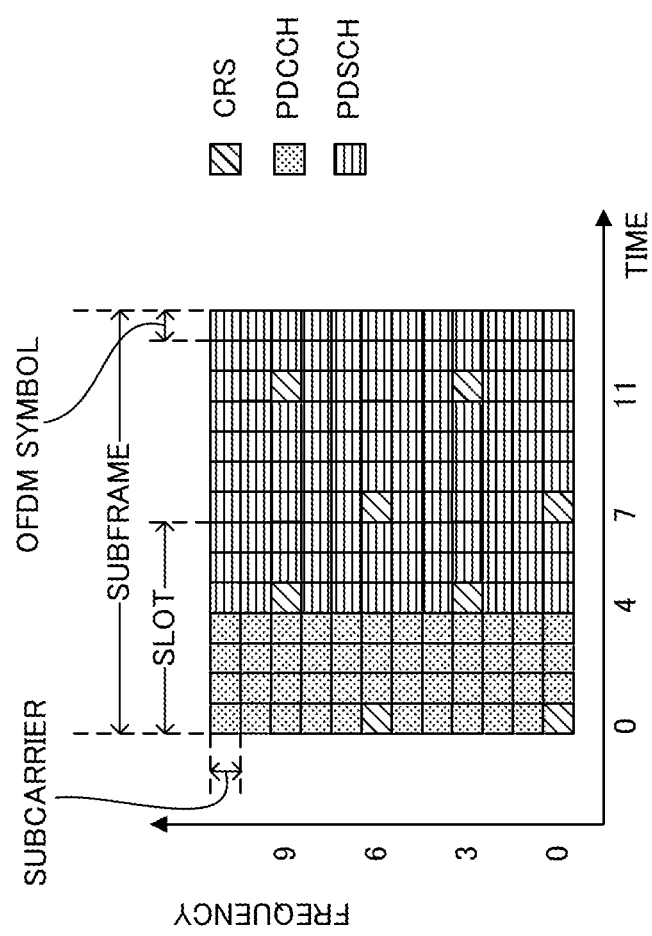
FIG. 7 is a diagram illustrating an example of allocation of a wireless resource of a downlink subframe according to an LTE scheme.

FIG. 7 illustrates an example of allocation of a wireless resource in subframe of the downlink communication in conformity with the LTE scheme. The example of FIG. 7 assumes that Normal CP is used and the number of transmitting antennas is one. Alternatively, the manner of allocation of a wireless resource may be different from that of FIG. 7.

A wireless resource is identified in terms of a time and a frequency. A wireless resource corresponding to a single OFDM symbol time of a single OFDM subcarrier is called a resource element (RE). In other words, a wireless resource includes multiple REs having different combinations of a time and a frequency. In this embodiment, a time period corresponding to seven REs successive along the time axis is called a slot; and two slots successive along the time axis constitute a single subframe.

In this embodiment, among REs contained in a single slot along the time axis, REs corresponding to 12 subcarriers successive along the frequency axis constitute a unit called a resource block (RB). Accordingly, a single RB of this embodiment consists of 84 (=12×7) REs.

As illustrated in FIG. 7, among the REs of the zeroth and the sixth subcarriers, the REs of the zeroth and the seventh symbol times are allocated to CRSs. The l-th symbol time corresponds to the time of the l-th OFDM symbol along the time axis. Among the REs contained in the third and the ninth subcarriers, the REs of the fourth and the eleventh symbol times are allocated to CRSs.

Among the REs of the zeroth through the third symbol times from the front position of the subframe, the REs, which are different from REs allocated to CRSs, are allocated to a Physical Downlink Control Channel (PDCCH). The PDCCH is an example of a control channel, through which the control information is carried.

Among the REs contained in the two RBs illustrated in FIG. 7, REs, which are different from REs allocated to the PDCCH or the CRSs, are allocated to a Physical Downlink Shared Channel (PDSCH). The PDSCH is an example of a data channel, through which data destined for a mobile station 20 is carried.

The IFFT processor 118 of FIG. 6 performs inverse Fast Fourier transform (IFFT) on the signal multiplexed by the channel multiplexer 117.

The CP adder 119 adds a CP to the signal obtained by the IFFT by the IFFT processor 118 and thereby generates an OFDM symbol.

The wireless processor 104 performs Digital to Analog (D/A) conversion on the signal output from the downlink transmitter 103. The wireless processor 104 carries out frequency conversion (here, up-conversion) from a baseband to a wireless frequency band on the signal obtained through the D/A conversion. The wireless processor 104 transmits the signal obtained by the frequency conversion through the antenna 16-1.

The wireless processor 104 may transmit a wireless signal via multiple antennas 16-1, . . . , 16-P. The wireless processor 101 and the wireless processor 104 may share at least one antenna among the multiple antennas 16-1, . . . , 16-P.

In this embodiment, the macro base station 10-1 has the same function as that of the micro base station 10-2. The macro base station 10-1 may omit the interfering cell CRS information generator 112 and the ABS allocation information generator 113.

The macro base station 10-1 is different from the micro base station 10-2 in transmitting the ABS in the subframe identified by the ABS allocation information. When the communication traffic is larger than the threshold, the macro base station 10-1 may transmit a subframe, in which an RE different from an RE allocated to the CRS is allocated to data, in place of the ABS.

Figure 8:
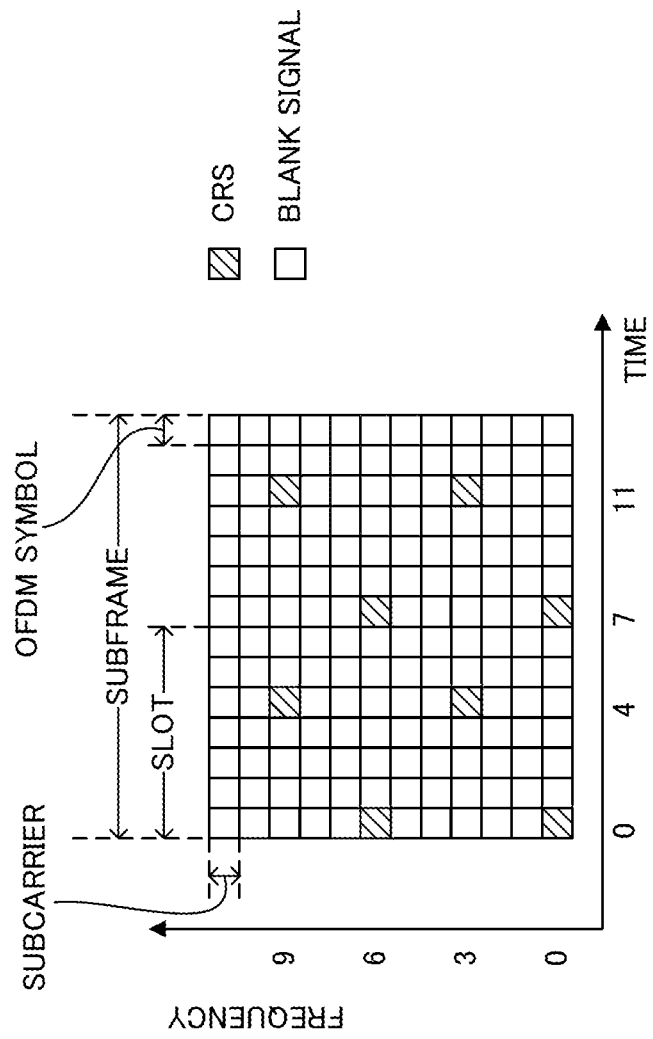
FIG. 8 is a diagram illustrating an example of allocation of a wireless resource of a downlink ABS according to the LTE scheme.

FIG. 8 is an example of allocation of a wireless resource in a downlink ABS in conformity with the LTE scheme. In the example of FIG. 8, likewise the example of FIG. 7, a Normal CP is adapted and the number of transmission antennas is assumed to be one. The manner of allocation of a wireless resource may be different from that of FIG. 8.

As illustrated in FIG. 8, in an ABS, RE is allocated to a CRS likewise the example of FIG. 7. Differently from the example of FIG. 7, blank signals are allocated to the remaining REs, which are different from REs allocated to CRSs, among the REs included in the ABS. In this embodiment, transmission of blank signal means that a carrier wave is transmitted without being modulated, or that predetermined dummy signals are transmitted. REs of the ABS may be allocated to a synchronization signal and broadcast information.

(Function: Mobile Station)

Figure 9:
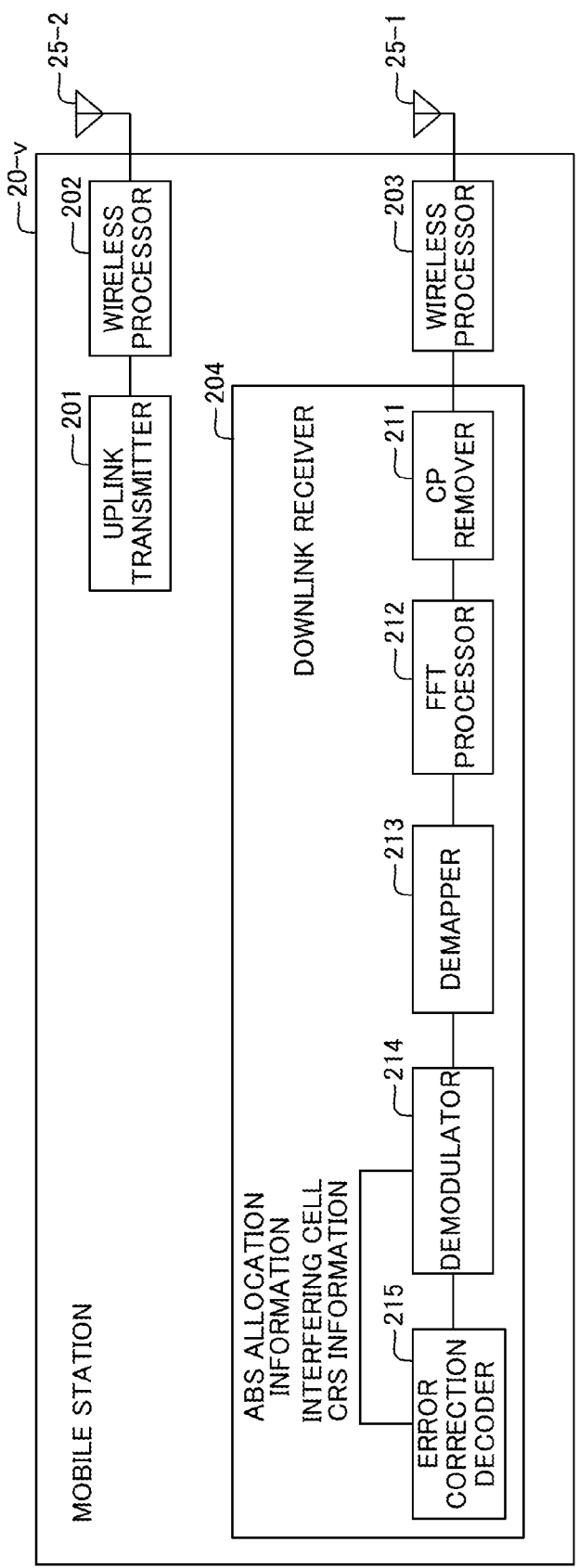
FIG. 9 is a block diagram illustrating an example of the function of a mobile station of FIG. 3.

As illustrated in FIG. 9, the functions of the LSI 23 and the wireless processing circuit 24 of the mobile station 20-v of FIG. 5 exemplarily include an uplink transmitter 201, a wireless processor 202, a wireless processor 203, and a downlink receiver 204. The wireless processor 203 is an example of a receiver.

The uplink transmitter 201 generates data destined for a base station 10, performs error correction coding on the generated data, and modulates the data obtained by the coding.

The wireless processor 202 performs D/A conversion on the signal obtained through the modulation by the uplink transmitter 201. Furthermore, the wireless processor 202 carries out frequency conversion (here, up-conversion) from a baseband to a wireless frequency band on the signal obtained by the D/A conversion. The wireless processor 202 transmits the signal obtained by the frequency conversion through the antenna 25-2. Alternatively, the wireless processor 202 may transmit the wireless signal through multiple antennas 25-2, . . . , 25-Q.

Along the above procedure, the uplink transmitter 201 and the wireless processor 202 transmit an uplink signal to a base station 10.

In this embodiment, the wireless processor 203 receives a wireless signal through the antenna 25-1. Alternatively, the wireless processor 203 may receive a wireless signal through multiple antennas 25-1, . . . , 25-Q. The wireless processor 202 and the wireless processor 203 may share at least one antenna of the multiple antennas 25-1, . . . , 25-Q.

The wireless processor 203 performs frequency conversion (here, down-conversion) from a wireless frequency band to the baseband on a wireless signal received through the antenna 25-1. The wireless processor 203 performs A/D conversion on the signal obtained by the frequency conversion.

The downlink receiver 204 processes the signal output from the wireless processor 203. The process of the downlink receiver 204 includes, for example, demodulation and error correction decoding.

The downlink receiver 204 exemplarily includes a CP remover 211, an FFT processor 212, a demapper 213, a demodulator 214, and an error correction decoder 215. The FFT is an abbreviation for Fast Fourier Transform.

The CP remover 211 removes the CP from the signal output from the wireless processor 203. The FFT processor 212 carries out Fast Fourier Transform (FFT) on the signal obtained by removal of the CP. The demapper 213 demaps the signal obtained by the FFT performed by the FFT processor 212. For example, demapping may include a process of extracting a component for each channel or each RE from the signal obtained by the FFT.

The demodulator 214 demodulates the signal obtained through demapping by the demapper 213. The signal input into the demodulator 214 is an example of a received wireless signal. The demodulator 214 will be further detailed below. The error correction decoder 215 performs error correction decoding on the signal obtained by the demodulating of the demodulator 214.

Along the above procedure, the downlink receiver 204 regenerates the data transmitted from the base station 10. In this embodiment, the error correction decoder 215 notifies the demodulator 214 of the ABS allocation information and the interfering cell CRS information in the data after undergoing the error correction decoding.

Here, the demodulator 214 will now be detailed.

Figure 10:
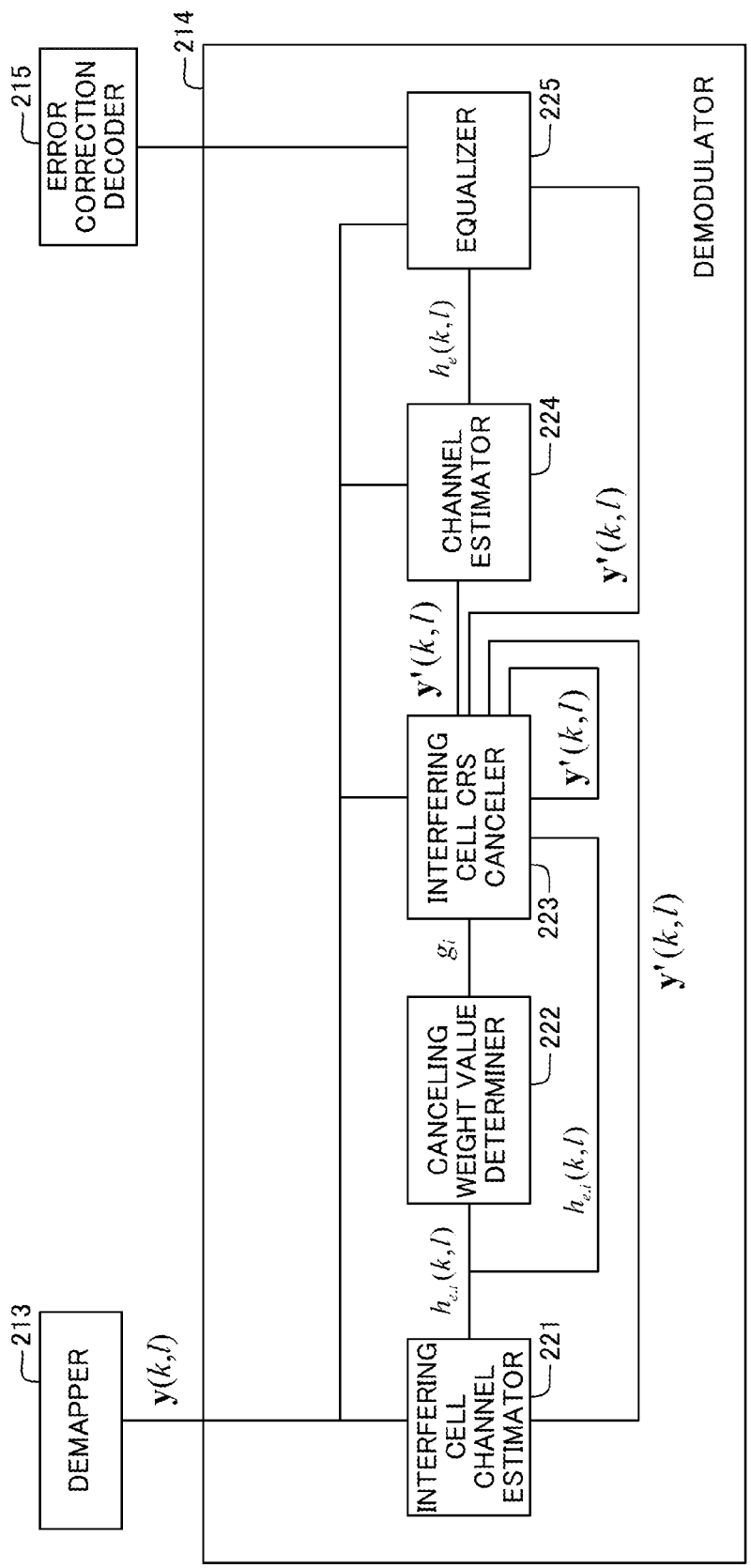
FIG. 10 is a block diagram illustrating an example of the function of a demodulator of FIG. 9.

As illustrated in FIG. 10, the demodulator 214 exemplarily includes an interfering cell channel estimator 221, a canceling weight value determiner 222, an interfering cell CRS canceler 223, a channel estimator 224, and an equalizer 225. The interfering cell channel estimator 221 is an example of an estimator. The canceling weight value determiner 222 is an example of a controller that controls a weight value to be multiplied by a replica signal of the known signal. The interfering cell CRS canceler 223 is an example of a processor that processes the received signal.

In this embodiment, the demodulator 214 selects an interfering cell to be subjected to a canceling process among multiple interfering cells. The canceling process cancels a component derived from a CRS transmitted in the interfering cell to be subjected to the process from an input value of the received signal.

For example, the demodulator 214 may select an interfering cell having a reception intensity larger than a certain threshold as an interfering cell to be subjected to the canceling process among multiple interfering cells. Alternatively, the demodulator 214 may select a predetermined number of interfering cells having larger reception intensities as the interfering cells to be subjected to the canceling process.

Alternatively, the demodulator 214 may perform the canceling process on all the interfering cells, not selecting one or more interfering cells to be subjected to the canceling process.

In this embodiment, the term $N_{cancel}$ represents the number of selected interfering cells and is equal to or lower than the total number $N_{cell}$ of interfering cells.

In the first embodiment, the demodulator 214 sequentially performs the canceling process for one or more selected interfering cells one at each time. In this embodiment, the demodulator 214 uses the tentative value of the received signal, the value being obtained as a result of the canceling process, as an input value of a received signal in a canceling process to be carried out next. This means that the demodulator 214 uses the tentative value of the received signal, the value being obtained as a result of the canceling process performed for the i-th interfering cell among the selected interfering cells, as an input value of a received signal in a canceling process to be carried out for the (i+1)-th interfering cell among the selected interfering cells. Here, the symbol i represents an integer of 1 to $N_{cancel}-1$.

In this embodiment, the demodulator 214 uses the received signal y output from the demapper 213 as an input value of the received signal for a canceling process to be performed for the first interfering cell among the selected interfering cells.

Hereinafter, description will now be made in relation to a canceling process to be performed for the i-th interfering cell among the selected interfering cells.

The demodulator 214 performs a canceling process on each RE allocated to a CRS in the i-th interfering cell. In this embodiment, the demodulator 214 recognizes an RE allocated to a CRS in the i-th interfering cell on the basis of the ABS allocation information and the interfering cell CRS information. In the following description, an RE of the l-th symbol time among the REs of the k-th subcarrier represents an RE allocated to a CRS in the i-th interfering cell. An RE allocated to a CRS is also referred to as a CRS-allocated RE.

The interfering cell channel estimator 221 estimates a channel between the base station 10 and the mobile station 20 in the i-th interfering cell. In this embodiment, the interfering cell channel estimator 221 estimates the channel by using an input value of the received signal for a CRS-allocated RE in the i-th interfering cell. In this embodiment, the term $h_{e,i}(k, l)$ represents an estimated value of a channel for the CRS-allocated RE between the base station 10 and the mobile station 20 in the i-th interfering cell.

The canceling weight value determiner 222 determines a weight value $g_i$ for the CRS-allocated RE in the i-th interfering cell. The weight value $g_i$ is an example of a first weight value, and may be called a canceling weight value. The canceling weight value determiner 222 will be detailed below.

The interfering cell CRS canceler 223 calculates a tentative value y' of the received signal based on the weight value $g_i$ determined by the canceling weight value determiner 222, the input value y of the received signal, and the estimated value $h_{e,i}$ of the channel estimated by the interfering cell channel estimator 221 using Expression 6.

$$y'(k,l) = y(k,l) - g_i h_{e,i}(k,l) x_i^{(CRS)}(k,l) \qquad \text{[Expression 6]}$$

Here, the term $x_i^{(CRS)}(k, l)$ represents a CRS transmitted in the i-th interfering cell.

As denoted in Expression 6, the interfering cell CRS canceler 223 subtracts a signal corresponding to the product of the CRS replica signal in the i-th interfering cell and the weight value $g_i$ from the received signal y. Thereby, the interfering cell CRS canceler 223 cancels the component derived from the CRS transmitted in the i-th interfering cell from the received signal. In this embodiment, the CRS replica signal is a signal obtained by multiplying the estimated value $h_{e,i}$ of the channel between the base station 10 and the mobile station 20 in the i-th interfering cell and a reference signal $x_i^{(CRS)}$ transmitted in the i-th interfering cell.

The interfering cell CRS canceler 223 outputs the tentative value y' of the received signal, the tentative value being calculated in the canceling process for the $N_{cancel}$-th interfering cell, as the received signal y' after undergoing the canceling.

Here, the canceling weight value determiner 222 will now be detailed.

Substituting Expressions 7 and 8 into Expression 6 derives Expression 9. Here, the term $h_i$ represents the true value of the channel between the base station 10 and the mobile station 20 in the i-th interfering cell, and the term $m_i$ represents an estimation error of the channel between the base station 10 and the mobile station 20 in the i-th interfering cell.

$$h_{e,i} = h_i + m_i \quad \text{[Expression 7]}$$

$$y = hx + \sum_{c=1}^{N_{cell}} h_c x_c^{(CRS)} + n \quad \text{[Expression 8]}$$

$$y' = y - g_i h_{e,i} x_i^{(CRS)} \quad \text{[Expression 9]}$$

$$= hx + \sum_{c=1}^{N_{cell}} h_c x_c^{(CRS)} + n - g_i(h_i + m_i) x_i^{(CRS)}$$

$$= hx + (1 - g_i) h_i x_i^{(CRS)} - g_i m_i x_i^{(CRS)} +$$

$$\sum_{c=1, c \neq i}^{N_{cell}} h_c x_c^{(CRS)} + n$$

From the above, the signal h*y' obtained by pre-multiplying the tentative value y' of the received signal by the complex conjugate h* of the true value h of the channel between the base station 10 and the mobile station 20 in the serving cell is expressed by Expression 10.

$$h^* y' = |h|^2 x + \quad \text{[Expression 10]}$$

$$h^* \left\{ (1 - g_i) h_i x_i^{(CRS)} - g_i m_i x_i^{(CRS)} + \sum_{c=1, c \neq i}^{N_{cell}} h_c x_c^{(CRS)} + n \right\}$$

The pre-multiplication of the received signal y' by the complex conjugate h* of the true value h of the channel is also referred to as equalization of the received signal y' or demodulation of the received signal y'. Accordingly, the Signal-to-Interference-plus-Noise Ratio (SINR) of the demodulated received signal is expressed by Expression 11. In this expression, the term $E\{A\}$ represents the average of variable A.

$$SINR = \frac{|h|^2 E\{|x|^2\}}{\begin{bmatrix} |1 - g_i|^2 |h_i|^2 E\{|x_i^{(CRS)}|^2\} + |g_i|^2 E\{|m_i|^2\} E\{|x_i^{(CRS)}|^2\} + \\ \sum_{c=1, c \neq i}^{N_{cell}} |h_c x_c^{(CRS)}|^2 + E\{|n|^2\} \end{bmatrix}} \quad \text{[Expression 11]}$$

The weight value $g_i$ that maximizes the SINR is calculated by Expression 12.

$$\frac{\partial}{\partial g_i} SINR = 0 \quad \text{[Expression 12]}$$

Expression 13 is derived by substituting Expression 11 into Expression 12 and then solving Expression 12.

$$g_i = \frac{1}{1 + E\{|m_i|^2\}/|h_i|^2} \quad \text{[Expression 13]}$$

The second term of the denominator of Expression 13 represents the error of mean square of the estimated value of the channel of the i-th interfering cell. Expression 13 indicates that the weight value $g_i$ takes a value of from 0 to 1. As the above error of mean square increases due to low precision in the channel estimation, the weight value $g_i$ comes to be smaller. In contrast, as the error of mean square decreases due to high precision in the channel estimation, the weight value $g_i$ comes to be closer to one.

Figure 11:
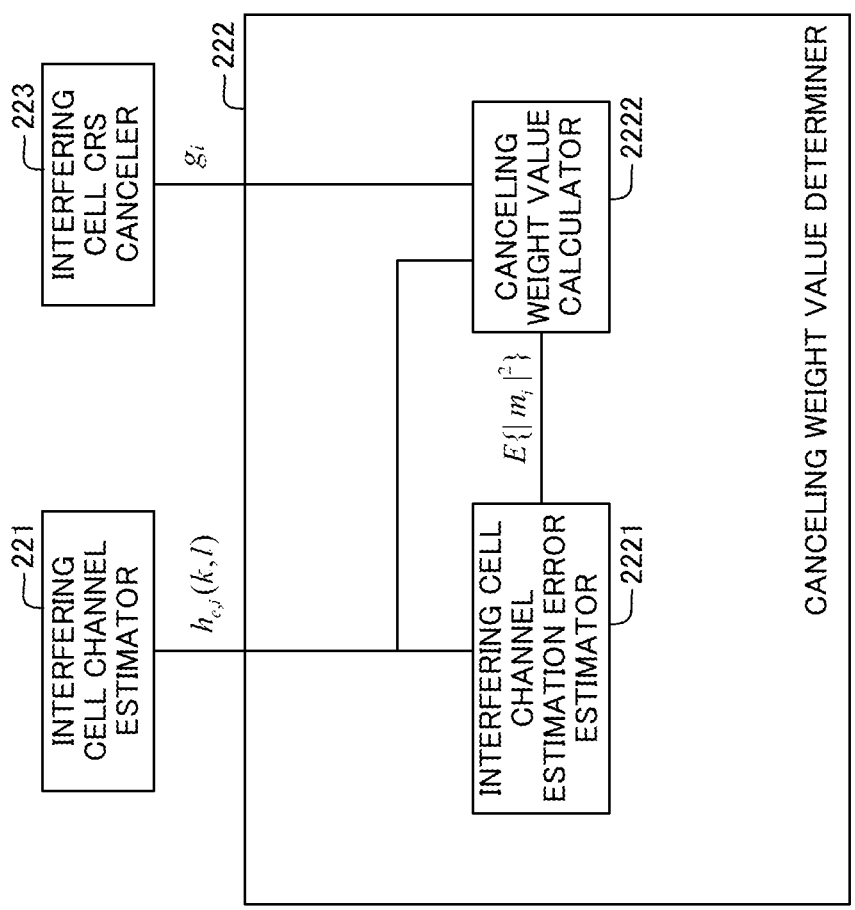
FIG. 11 is a block diagram illustrating an example of the function of a canceling weight value determiner of FIG. 10.

As illustrated in FIG. 11, the canceling weight value determiner 222 includes an interfering cell channel estimation error estimator 2221 and a canceling weight value calculator 2222.

The interfering cell channel estimation error estimator 2221 estimates an error of the estimated value of the channel of the i-th interfering cell. In this embodiment, the error is an error $E\{|m_i|^2\}$ of mean square.

In this embodiment, the above error is obtained by converting the difference between the estimated values of channels corresponding to two REs each having a time and a frequency within a certain resource range into an power value and averaging the converted power values. For example, the resource range may be a RE group consisting of REs belonging to a certain symbol time and having subcarriers in a certain frequency range or a RE group consisting of REs belonging to a certain subcarrier and having symbol times in a certain time range.

In this embodiment, the above error is calculated as indicated by Expression 14 by converting the difference between the estimated values of channels of RE of the k-th and the (k+Δk)-th subcarriers of the l-th symbol time into an power value and averaging the converted power values.

$$E\{|m_i|^2\} = \frac{1}{2} E\{|h_{e,i}(k, l) - h_{e,i}(k + \Delta k, l)|^2\} \quad \text{[Expression 14]}$$

The canceling weight value calculator 2222 calculates the weight value $g_i$ based on the error $E\{|m_i|^2\}$ estimate by the interfering cell channel estimation error estimator 2221 and the estimated value $h_{e,i}$ of the channel estimated by the interfering cell channel estimator 221. In this example, the canceling weight value calculator 2222 estimates the weight value $g_i$ using Expression 15.

$$g_i = \frac{1}{1 + E\{|m_i|^2\}/(|h_{e,i}|^2 - E\{|m_i|^2\})} \quad \text{[Expression 15]}$$

The channel estimator 224 of FIG. 10 estimates a channel between the base station 10 and the mobile station 20 in the serving cell. In this embodiment, the channel estimator 224 estimates the channel using the received signal corresponding to the CRS-allocated RE in the serving cell. The term $h_e(k, l)$ represents an estimated value of the channel of the CRS-allocated RE between the base station 10 and the mobile station 20 in the serving cell. Here, an RE of the l-th symbol time among the REs of the k-th subcarrier serves as a CRS-allocated RE in the serving cell.

The received signal to be used for estimating a channel of an RE for which the interfering cell CRS canceler 223 outputs the received signal y' obtained by the canceling is the received signal y' after undergoing the canceling. In contrast, the received signal to be used for estimating a channel of an RE different from the RE for which the interfering cell CRS canceler 223 outputs the received signal y' obtained by the canceling is the received signal y input into the demodulator 214.

The equalizer 225 equalizes the received signal using the received signal and the estimated value of the channel estimated by the channel estimator 224. The received signal to be used for equalizing for an RE for which the interfering cell CRS canceler 223 outputs the received signal y' obtained by the canceling is the received signal y' after undergoing the canceling. In contrast, the received signal to be used for equalizing for an RE different from the RE for which the interfering cell CRS canceler 223 outputs the received signal y' obtained by the canceling is the received signal y input into the demodulator 214.

The equalizer 225 calculates a Log Likelihood Ratio (LLR) for soft-decision decoding based on the received signal obtained by the equalizing. For example, the equalizer 225 may calculate an LLR in the method described in Japanese Patent No. 5326976.

(Operation)

Next, the operation of the wireless communication system 1 will now be described. Here, the description focuses on the demodulation in the mobile station 20-1 among the operation in the wireless communication system 1.

Figure 12:
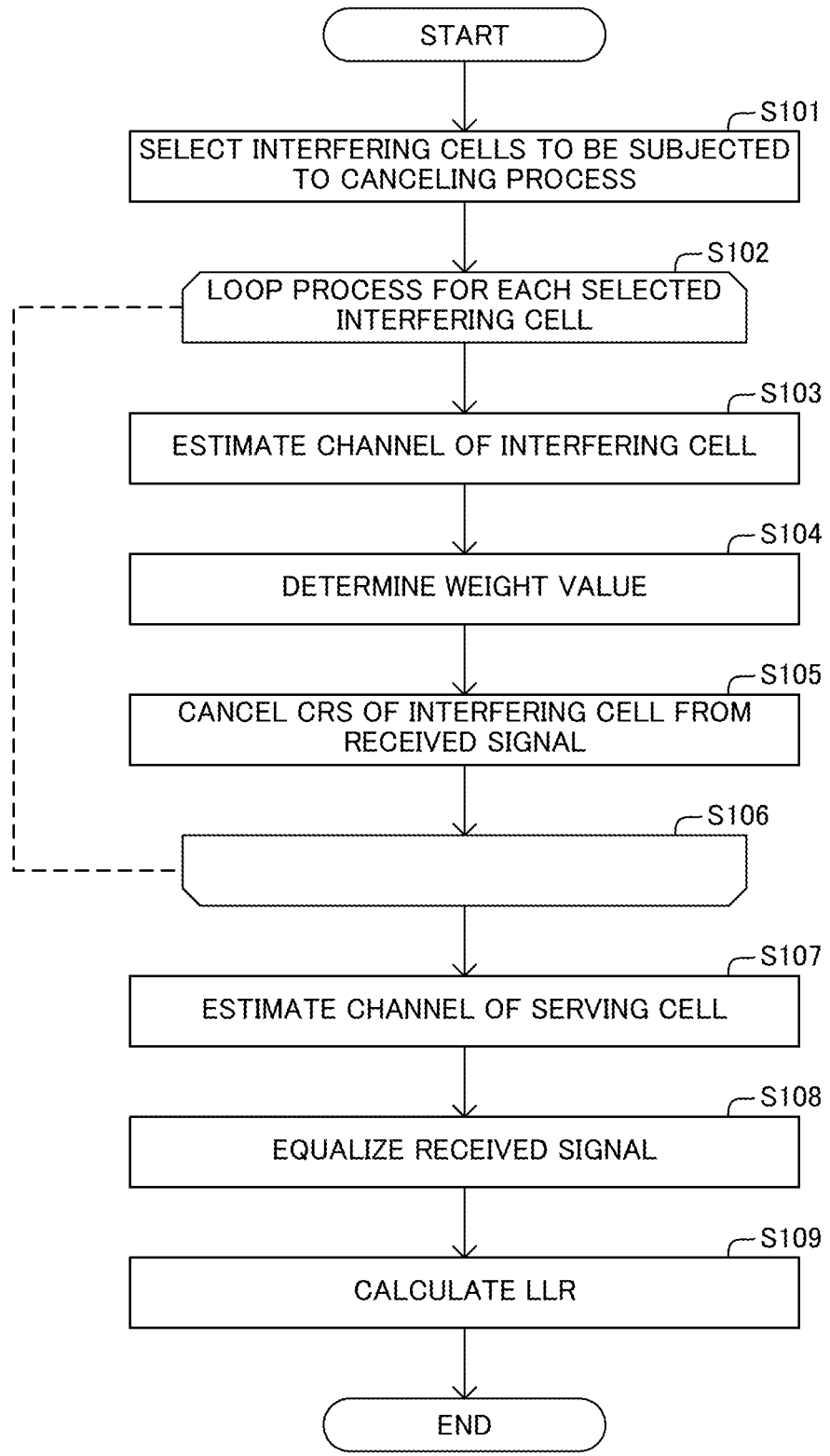
FIG. 12 is a flow diagram illustrating an example of succession of procedural steps performed by a mobile station of FIG. 3.

The mobile station 20-1 executes the procedural step of the flow diagram of FIG. 12.

In this embodiment, the mobile station 20-1 selects interfering cells to be subjected to a canceling process among multiple interfering cells (step S101 of FIG. 12).

Next, the mobile station 20-1 executes loop processes sequentially for the selected interfering cells one for each time (steps S102-S106 of FIG. 12).

In the loop process, the mobile station 20-1 first estimates a channel (in other words, a channel of the interfering cell) between the base station 10 and the mobile station 20-1 in the interfering cell subjected to the loop process (step S103 of FIG. 12). In this embodiment, the mobile station 20-1 estimates a channel for an RE allocated to a CRS in the interfering cell subjected to the loop process on the basis of the CRS transmitted from the base station 10 of the interfering cell subjected to the loop process.

The mobile station 20-1 estimates an error of the estimated value of the channel of the interfering cell subjected to the loop process. The mobile station 20-1 then determines the weight value based on the estimation error and the estimated value of the channel of the interfering cell (step S104 of FIG. 12).

The mobile station 20-1 updates the received signal by canceling the component derived from the CRS transmitted in the interfering cell from the received signal on the basis of the determined weight value, the estimated value of the channel of the interfering cell, and the received signal (step S105 of FIG. 12).

After the mobile station 20-1 carries out the above loop processes for all the selected interfering cells (steps S102-S106 of FIG. 12), the mobile station 20-1 moves the procedure to step S107.

The mobile station 20-1 estimates the channel (in other words, the channel of the serving cell) between the base station 10-2 and the mobile station 20-1 in the serving cell (in this example, a wireless area WA-2) on the basis of the received signal obtained by the canceling (step S107 of FIG. 12). In this example, the mobile station 20-1 estimates a channel of the RE allocated to the CRS in the serving cell on the basis of the CRS transmitted from the base station 10-2 in the serving cell.

The mobile station 20-1 equalizes the received signal on the basis of the estimated value of the channel of the serving cell and the received signal obtained by the canceling (step S108 of FIG. 12).

Then the mobile station 20-1 calculates an LLR for soft-decision decoding on the basis of the received signal obtained by the equalization (step S109 of FIG. 12).

As described above, the mobile station 20-1 of the first embodiment estimates the channel of the received known signal, and on the basis of the result of the estimating, controls a weight value to be multiplied by the replica signal of the known signal.

This manner enables the mobile station 20-1 to cancel the known signal from the received signal with sufficiently high precision, so that the received signal can be processed appropriately. This makes it possible to enhance the quality of the wireless communication.

Further, the mobile station 20-1 determines the weight value that maximizes the SINR of the received signal after undergoing the demodulation.

Consequently, the received signal after undergoing the demodulation can have an enhanced SINR, so that the quality of the wireless communication can be enhanced.

Besides, for the mobile station 20-1 of the first embodiment, the known signal is transmitted in the wireless area WA-1 different from the wireless area WA-2 where a desired signal is transmitted.

This makes it possible to cancel, from the received signal, a component derived from the known signal transmitted in the wireless area WA-1 different from the wireless area WA-2 where a desired signal is transmitted with sufficiently high precision. This allows the mobile station 20-1 to receive the desired signal at high quality, so that the received signal can be appropriately processed.

As described above, the demodulator 214 of the first embodiment executes the canceling processes sequentially for each interfering cell, but alternatively may execute the cancelling processes for the interfering cells in parallel.

Assuming that the canceling processes are carried out in parallel, the demodulator 214 estimates a channel of each selected interfering cell and determines the respective weight values. Furthermore, the demodulator 214 cancels a component derived from a CRS transmitted from each interfering cell from the received signal on the basis of the estimated value $h_{e,j}$ of the channel of the interfering cell, the determined weight value $g_j$, and the reference signal $x_j^{(CRS)}$ using Expression 16. Here, the symbol j represents an integer of one to $N_{cancel}$.

$$y'(k, l) = y(k, l) - \sum_{j=1}^{N_{cancel}} g_j h_{e,j}(k, l) x_j^{(CRS)}(k, l) \quad \text{[Expression 16]}$$

This manner can accomplish the canceling process faster than the sequential canceling process.

Second Embodiment

Next, description will now be made in relation to a wireless communication system according to a second embodiment.

The wireless communication system of the second embodiment is different from that of the first embodiment in the point that the weight value is determined on the basis of the state of the communication in an interfering cell in the second embodiment. The following description will focus on the difference.

An estimation error of the estimated value of the channel correlates with the SINR, the Doppler frequency, and a delay spread.

Considering the above, the mobile station 20 of the second embodiment estimates the SINR, the Doppler frequency, and the delay spread in each interfering cell and determines the weight value based on the estimated SINR, the estimated Doppler frequency, and the estimated delay spread in each interfering cell. This can determine an appropriate weight value.

Figure 13:
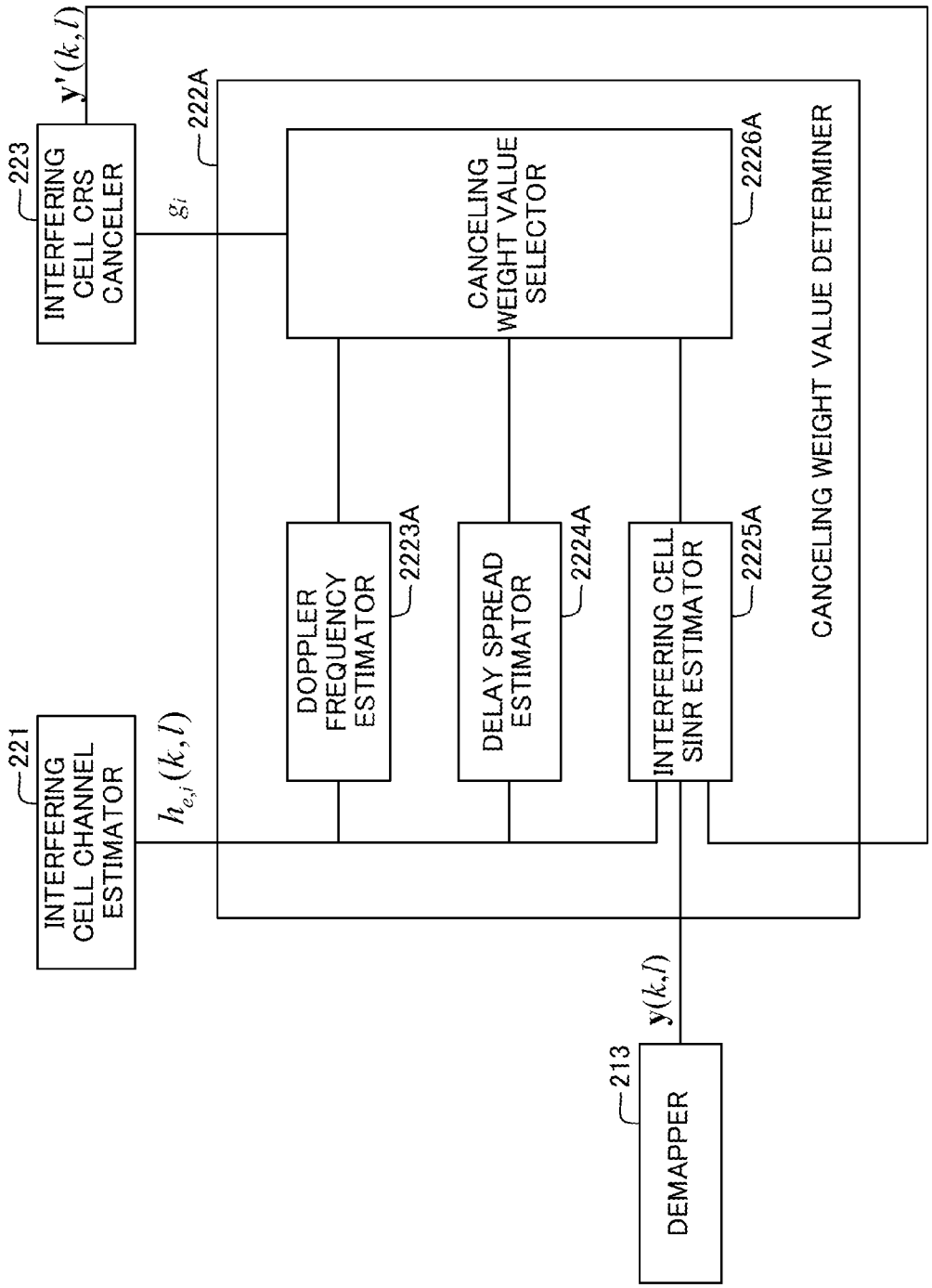
FIG. 13 is a block diagram illustrating an example of the function of a cancelling weight value determiner included in a mobile station according to a second embodiment.

As illustrated in FIG. 13, the canceling weight value determiner 222A of the second embodiment includes a Doppler frequency estimator 2223A, a delay spread estimator 2224A, an interfering cell SINR estimator 2225A, and a canceling weight value selector 2226A.

The Doppler frequency estimator 2223A estimates the Doppler frequency of the communication between a base station 10 and a mobile station 20 in an interfering cell on the basis of the estimated value of the channel of the interfering cell. For example, the Doppler frequency estimator 2223A may estimate the Doppler frequency in the manner described in Japanese Patent No. 4358686. The wireless communication between the base station 10 and the mobile station 20 in the interfering cell is also referred to as interfering-cell communication.

The delay spread estimator 2224A estimates the delay spread of interfering-cell communication on the basis of the estimated value of the channel of the interfering cell. For example, the delay spread estimator 2224A may estimate the delay spread in the method described in Japanese Laid-open Patent Publication No. 2011-030249.

The interfering cell SINR estimator 2225A estimates an SINR of interfering-cell communication on the basis of the estimated value of the channel of the interfering cell, the received signal input into the demodulator 214, and the received signal output from the interfering cell CRS canceler 223. The SINR of the interfering-cell communication may be also referred to as an interfering-cell SINR.

The canceling weight value selector 2226A selects the weight value based on the estimated Doppler frequency, the estimated delay spread, the estimated interfering-cell SINR, and information retained in advance. The weight value is an example of the first weight value. The information retained in advance represents the relationship among the Doppler frequency, the delay spread, the interfering cell SINR, and the weight value, and may be, for example, in the form of a table.

The above relationship may vary according to a manner of estimating a channel, or an algorithm of estimating a channel. Accordingly, the canceling weight value selector 2226A may retain the information, which represents the above relationship different with manners or algorithms of estimating a channel, in advance.

The mobile station 20 of the second embodiment functions the same as the mobile station 20 of the first embodiment, so that the mobile station 20 of the second embodiment provides the same effects and advantages as those of the mobile station 20 of the first embodiment.

Furthermore, the mobile station 20 of the second embodiment determines the weight value based on the SINR, the Doppler frequency, and the delay spread of an interfering cell.

This makes it possible to appropriately determine the weight value and consequently, cancellation of a known signal from the received signal attains high precision, so that the quality of the wireless signal can be enhanced.

Alternatively, the mobile station 20 may determine the weight value based on the combination of one or more of the SINR, the Doppler frequency, and the delay spread of the interfering cell.

Third Embodiment

Next, description will now be made in relation to a wireless communication system according to a third embodiment. The wireless communication system of the third embodiment is different from that of the first embodiment in the point that the first weight value is determined on the basis of second weight values in the third embodiment. In the third embodiment, the second weight values are multiplied by the received signal to estimate the channel, and the first weight value is multiplied by the replica signal of a known signal to cancel, from the received signal, the component derived from the known signal.

The following description will be focus on the difference.

Figure 14:
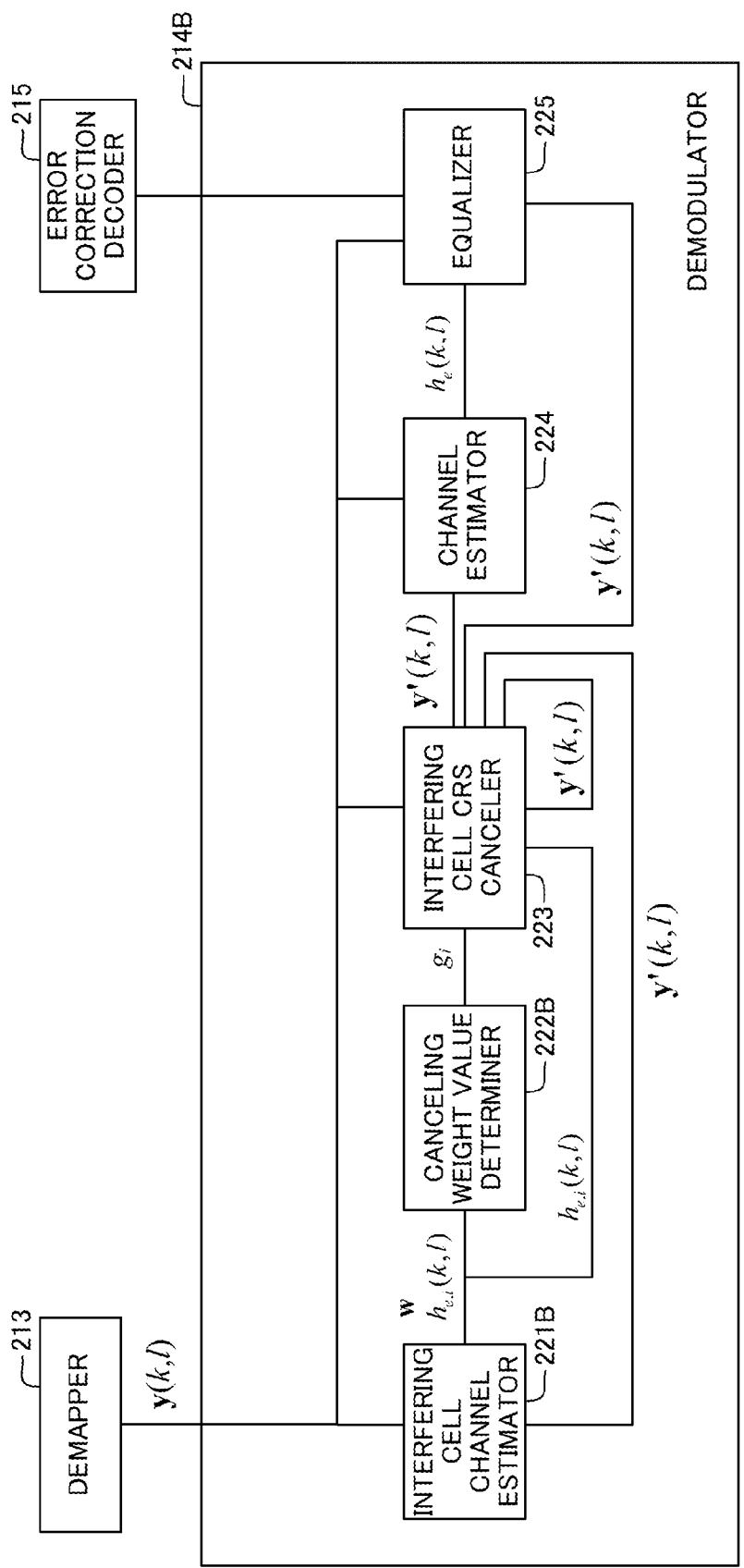
FIG. 14 is a block diagram illustrating an example of a demodulator included in a mobile station according to a third embodiment.

As illustrated in FIG. 14, the demodulator 214B of the third embodiment has the same function as that of the demodulator 214 of the first embodiment except for the following first and second differences. The first difference is that the demodulator 214B includes an interfering cell channel estimator 221B in place of the interfering cell channel estimator 221 of FIG. 10; and the second difference is that the demodulator 214B includes a canceling weight value determiner 222B in place of the canceling weight value determiner 222 of FIG. 10.

The interfering cell channel estimator 221B estimates the channels of an interfering cell for respective CRS-allocated REs using the received signal for multiple (in this embodiment, $N_{RS}$) CRS-allocated REs. Here, the symbol $N_{RS}$ represents an integer equal to or more than two. In the third embodiment, the channel estimation uses the received signal for $N_{RS}$ CRS-allocated REs in the order of having a closer frequency and a closer time to the RE for which the channel is to be estimated.

In this embodiment, the interfering cell channel estimator 221B estimates the channel $h_{e,i}(p)$ for the p-th CRS-allocated RE among $N_{RS}$ CRS-allocated REs in the i-th interfering cell using Expression 17. The symbol p represents an integer of one to $N_{RS}$.

$$h_{e,i}(p) = w(X_i)^H y \qquad \text{[Expression 17]}$$

Here, the term $A^H$ represents the Hermitian conjugate of the matrix A. The term y is expressed by Expression 18. The term y(p) represents the received signal for the p-th CRS-allocated RE among $N_{RS}$ CRS-allocated REs used for the channel estimation.

$$y = \begin{bmatrix} y(1) \\ y(2) \\ \vdots \\ y(N_{RS}) \end{bmatrix} \qquad \text{[Expression 18]}$$

The term $X_i$ is expressed by Expression 19. The term $x_i^{(CRS)}(p)$ represents the reference signal allocated to the p-th CRS-allocated RE among $N_{RS}$ CRS-allocated REs used for the channel estimation. The assumption $E\{|x_i^{(CRS)}(1)|^2\} = E\{|x_i^{(CRS)}(1)|^2\} = \ldots = E\{|x_i^{(CRS)}(N_{RS})|^2\} = E\{|x_i^{(CRS)}|^2\}$ is established.

$$X_i = \begin{bmatrix} x_i^{(CRS)}(1) & & & O \\ & x_i^{(CRS)}(2) & & \\ & O & \ddots & \\ & & & x_i^{(CRS)}(N_{RS}) \end{bmatrix} \quad \text{[Expression 19]}$$

The term w is expressed by Expression 20. Here, the term w(p) represents a weight coefficient for the p-th CRS-allocated RE among $N_{RS}$ CRS-allocated REs used for the channel estimation. The weight coefficients may be determined in advance according to the manner of the channel estimation. A weight coefficient is also referred to as a tap coefficient, and is an example of the second weight value.

$$w = [w(1) w(2) \ldots w(N_{RS})] \quad \text{[Expression 20]}$$

Next, the canceling weight value determiner 222B will now be described.

For simplifying the description, it is assumed that only the i-th interfering cell serves as the interfering cell.

Substituting the Expression 8 into above Expression 6 without using Expression 7 derives Expression 21. For example, using Expression 7 corresponds to an assumption that the noise in the received signal is independent from the estimation error of the estimated value of a channel of the interfering cell.

$$\begin{aligned} y' &= y - g_i h_{e,i} x_i^{(CRS)} \quad \text{[Expression 21]} \\ &= hx + h_i x_i^{(CRS)} + n - g_i h_{e,i} x_i^{(CRS)} \\ &= hx + (h_i - g_i h_{e,i}) x_i^{(CRS)} + n \end{aligned}$$

Accordingly, the signal h*y being the product of the complex conjugate h* of the true value h of the channel between the base station 10 and the mobile station 20 in the serving cell and the tentative value y' of the received signal is expressed by Expression 22. The symbol n represents noise and the symbol $\sigma^2$ represents the variance of noise n.

$$h^* y' = |h|^2 x + h^* \{(h_i - g_i h_{e,i}) x_i^{(CRS)} + n\} \quad \text{[Expression 22]}$$

On the basis of Expression 22, the SINR of the received signal after undergoing the demodulation is expressed by Expression 23.

$$\begin{aligned} \text{SINR} = |h|^2 E\{|x|^2\}/(\{E[|h_i|^2] - g_i^* E[h_i h_{e,i}^*] - g_i \\ E[h_{e,i} h_i^*] + |g_i|^2 E[h_{e,i} h_{e,i}^*]\} E[|x_i^{(CRS)}|^2] - g_i \\ E[h_{e,i} x_i^{(CRS)} n^*] - g_i^* E[n h_{e,i}^* x_i^{(CRS)*}] + \sigma^2) \end{aligned} \quad \text{[Expression 23]}$$

Substituting Expression 23 into Expression 12 and then solving the substituted expression derive Expression 24.

$$g_i = \frac{E[h_i h_{e,i}^*] E[|x_i^{(CRS)}|^2] + E[n h_{e,i}^* x_i^{(CRS)*}]}{E[h_{e,i} h_{e,i}^*] E[|x_i^{(CRS)}|^2]} \quad \text{[Expression 24]}$$

Using Expression 25 to Expression 28 expresses the vector y of the received signal expressed by Expression 18 as expressed by Expression 29. Here, the term $h_i(p)$ represents a channel for the p-th CRS-allocated RE among the $N_{RS}$ CRS-allocated REs in the i-th interfering cell. The term h(p) represents a channel for the p-th CRS-allocated RE among the $N_{RS}$ CRS-allocated REs in the serving cell. The term n(p) represents the noise for the p-th CRS-allocated RE among the $N_{RS}$ CRS-allocated REs. The term $x^{(CRS)}(p)$ represents a reference signal allocated to the p-th CRS-allocated RE among the $N_{RS}$ CRS-allocated REs in the serving cell.

$$h_i = \begin{bmatrix} h_i(1) \\ h_i(2) \\ \vdots \\ h_i(N_{RS}) \end{bmatrix} \quad \text{[Expression 25]}$$

$$h = \begin{bmatrix} h(1) \\ h(2) \\ \vdots \\ h(N_{RS}) \end{bmatrix} \quad \text{[Expression 26]}$$

$$n = \begin{bmatrix} n(1) \\ n(2) \\ \vdots \\ n(N_{RS}) \end{bmatrix} \quad \text{[Expression 27]}$$

$$X = \begin{bmatrix} x^{(CRS)}(1) & & & O \\ & x^{(CRS)}(2) & & \\ & O & \ddots & \\ & & & x^{(CRS)}(N_{RS}) \end{bmatrix} \quad \text{[Expression 28]}$$

$$y = X_i h_i + X h + n \quad \text{[Expression 29]}$$

The first term $E[h_i(p) h_{e,i}^*(p)]$ in the numerator of Expression 24 is expressed by Expression 30.

$$\begin{aligned} E[h_i(p) h_{e,i}^*(p)] &= E[h_i(p) (w X_i^H y)^*] \quad \text{[Expression 30]} \\ &= E[h_i(p) y^H] X_i w^H \\ &= E[h_i(p) (X_i h_i + X h + n)^H] X_i w^H \\ &= E[h_i(p) h_i^H] w^H E[|x_i^{(CRS)}|^2] \\ &= E[|x_i^{(CRS)}|^2] \sum_{q=1}^{N_{RS}} E[h_i(p) h_i^*(q)] x^*(q) \end{aligned}$$

The second term in the numerator of Expression 24 is expressed by Expression 31.

$$\begin{aligned} E[n(p) h_{e,i}^*(p) x_i^{(CRS)*}(p)] &= E[n(p) (w X_i^H y)^* x_i^{(CRS)*}(p)] \quad \text{[Expression 31]} \\ &= w^*(p) \sigma^2 E[|x_i^{(CRS)}|^2] \end{aligned}$$

The denominator of Expression 24 is expressed by Expression 32.

[Expression 32]

$$\begin{aligned} E[h_{e,i}(p) h_{e,i}^*(p)] &= E[(w X_i^H y)(w X_i^H y)^*] \\ &= E[(w X_i^H y)(y^H X_i w^H)] \\ &= w X_i^H E[y y^H] X_i w^H \\ &= w X_i^H E[(X_i h_i + X h + n)(X_i h_i + X h + n)^H] X_i w^H \\ &= w X_i^H E[X_i h_i h_i^H X_i^H + X h h^H X^H + n n^H] X_i w^H \\ &= w X_i^H X_i E[h_i h_i^H] X_i^H X_i w^H + w X_i^H X E[h h^H] X^H X_i w^H + \\ &\quad w X_i^H E[n n^H] X_i w^H \\ &= (E[|x_i^{(CRS)}|^2])^2 w E[h_i h_i^H] w^H + \\ &\quad w X_i^H X E[h h^H] X^H X_i w^H + \sigma^2 w w^H E[|x_i^{(CRS)}|^2] \end{aligned}$$

Above Expression 32 uses X, which is information of the serving cell. Since this information may sometimes be unknown, substituting Expressions 30 and 31 into Expression 24 derives Expression 33, which represents the weight value $g_i(P)$ for the p-th CRS-allocated RE among the $N_{RS}$ CRS-allocated REs.

[Expression 33]

$$g_i(p) = \frac{E[|x_i^{(CRS)}|^2]E[|x_i^{(CRS)}|^2]\sum_{q=1}^{N_{RS}} E\begin{bmatrix} h_i(p) \\ h_i^*(q) \end{bmatrix} w^*(q) + w^*(p)\sigma^2 E[|x_i^{(CRS)}|^2]}{E[h_{e,i}(p)h_{e,i}^*(p)]E[|x_i^{(CRS)}|^2]}$$

$$= \frac{E[|x_i^{(CRS)}|^2]\sum_{q=1}^{N_{RS}} E[h_i(p)h_i^*(q)]w^*(q) + w^*(p)\sigma^2}{E[h_{e,i}(p)h_{e,i}^*(p)]}$$

Figure 15:
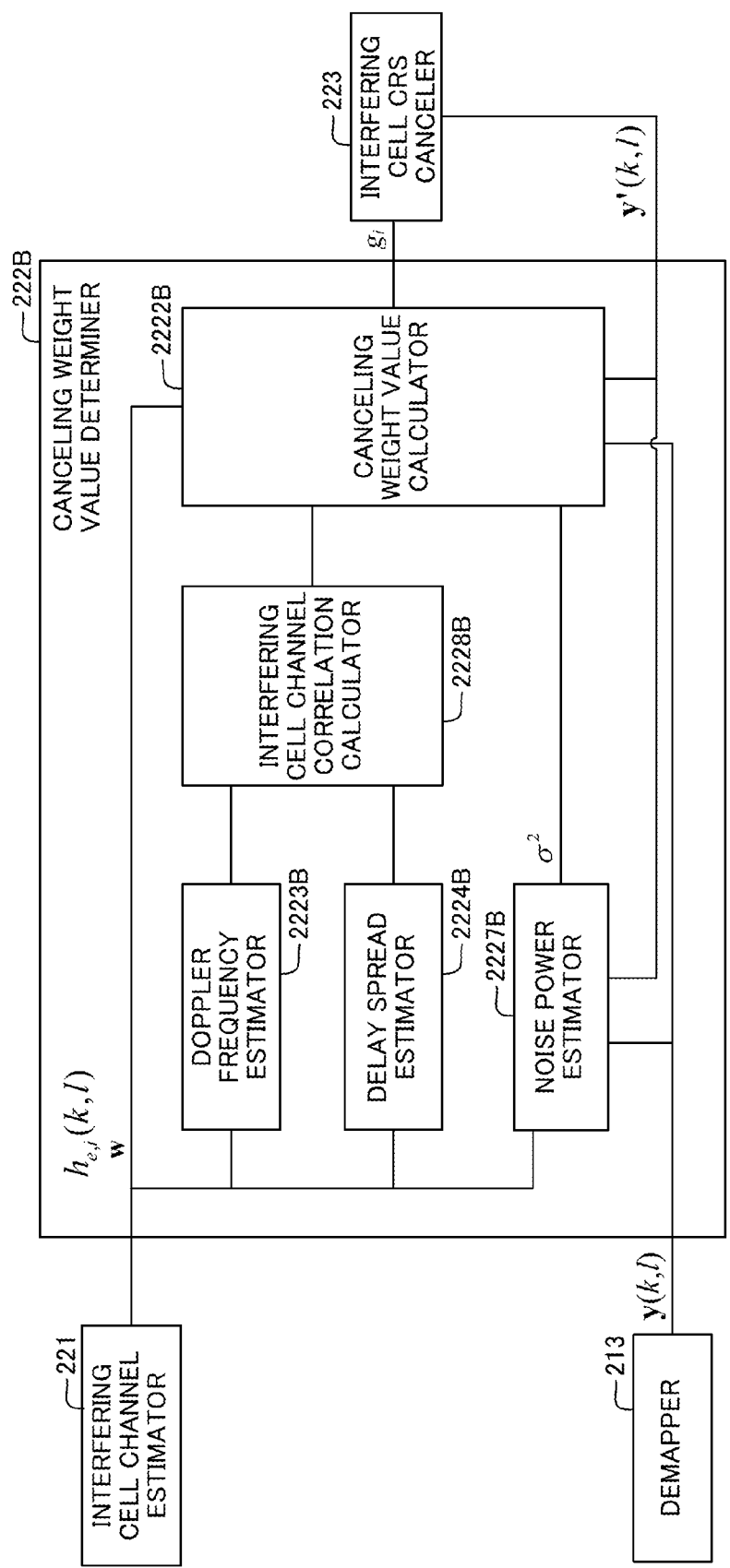
FIG. 15 is a block diagram illustrating an example of a function of a canceling weight value determiner of FIG. 14.

As illustrated in FIG. 15, the canceling weight value determiner 222B exemplarily includes a canceling weight value calculator 2222B, a Doppler frequency estimator 2223B, a delay spread estimator 2224B, a noise power estimator 2227B, and an interfering cell channel correlation calculator 2228B.

The Doppler frequency estimator 2223B and the delay spread estimator 2224B have the same functions as the Doppler frequency estimator 2223A and the delay spread estimator 2224A of FIG. 13, respectively.

The noise power estimator 2227B estimates the power of interference noise on the basis of the received signals output from the demapper 213 and the interfering cell CRS canceler 223. Here, interference noise includes an interfering wave and noise. In this embodiment, interference noise is a component different from the component derived from a desired signal and contained in the received signal.

The noise power estimator 2227B estimates the average value of the power of interfering waves on the basis of the estimated values of the channels of the interfering cells estimated by the interfering cell channel estimator 221. For example, the noise power estimator 2227B estimates noise power by subtracting the estimated average value of the power of the interfering waves from the estimated power of the interference noise. In this embodiment, the power of the noise is the variance $\sigma^2$ of the noise n.

The interfering cell channel correlation calculator 2228B calculates the correlation $E\{h_i(p)h_i^*(q)\}$ of the channel of the i-th interfering cell on the basis of the estimated Doppler frequency and the estimated delay spread.

The canceling weight value calculator 2222B calculates the weight value $g_i(p)$ based on the calculated correlation $E\{h_i(p)h_i^*(q)\}$ of the channel, the estimated value $h_{e,i}$ of the channel of the interfering cell, the weight coefficients w, and the estimated power $\sigma^2$ of the noise. The weight value $g_i(p)$ is an example of the first weight value. In this embodiment, the canceling weight value calculator 2222B calculates the weight value $g_i(p)$ using above Expression 33.

The mobile station 20 of the third embodiment functions the same as the mobile station 20 of the first embodiment, so that the mobile station 20 of the third embodiment provides the same effects and advantages as those of the mobile station 20 of the first embodiment.

The mobile station 20 of the third embodiment estimates the channel for the known signal by multiplying the received signal for multiple known signals by respective certain weight coefficients. Furthermore, the mobile station 20 determines the weight value to be multiplied by the replica signal of the known signal on the basis of the weight coefficients.

This makes it possible to estimate the channel based on multiple known signals with high precision. The estimation error of the estimated value of the channel correlates with the weight coefficients used for channel estimation. Accordingly, the mobile station 20 of the third embodiment can appropriately determine the weight value. Consequently, the known signals can be canceled from the received signal with sufficiently high precision, so that the quality of the wireless communication quality can be enhanced.

Fourth Embodiment

Next, description will now be made in relation to a wireless communication system according to a fourth embodiment. The wireless communication system of the fourth embodiment is different from that of the first embodiment in the point that the component derived from a CRS transmitted in the serving cell is canceled from the received signal in the fourth embodiment. The following description will focus on the difference.

The macro base station 10-1 of the fourth embodiment does not execute the control for transmitting an ABS. Accordingly, the macro base station 10-1 continuously transmits a subframe having an RE, which is different from an RE allocated to a CRS, being allocated to data. Alternatively, the macro base station 10-1 may execute the control for transmitting an ABS.

Figure 16:
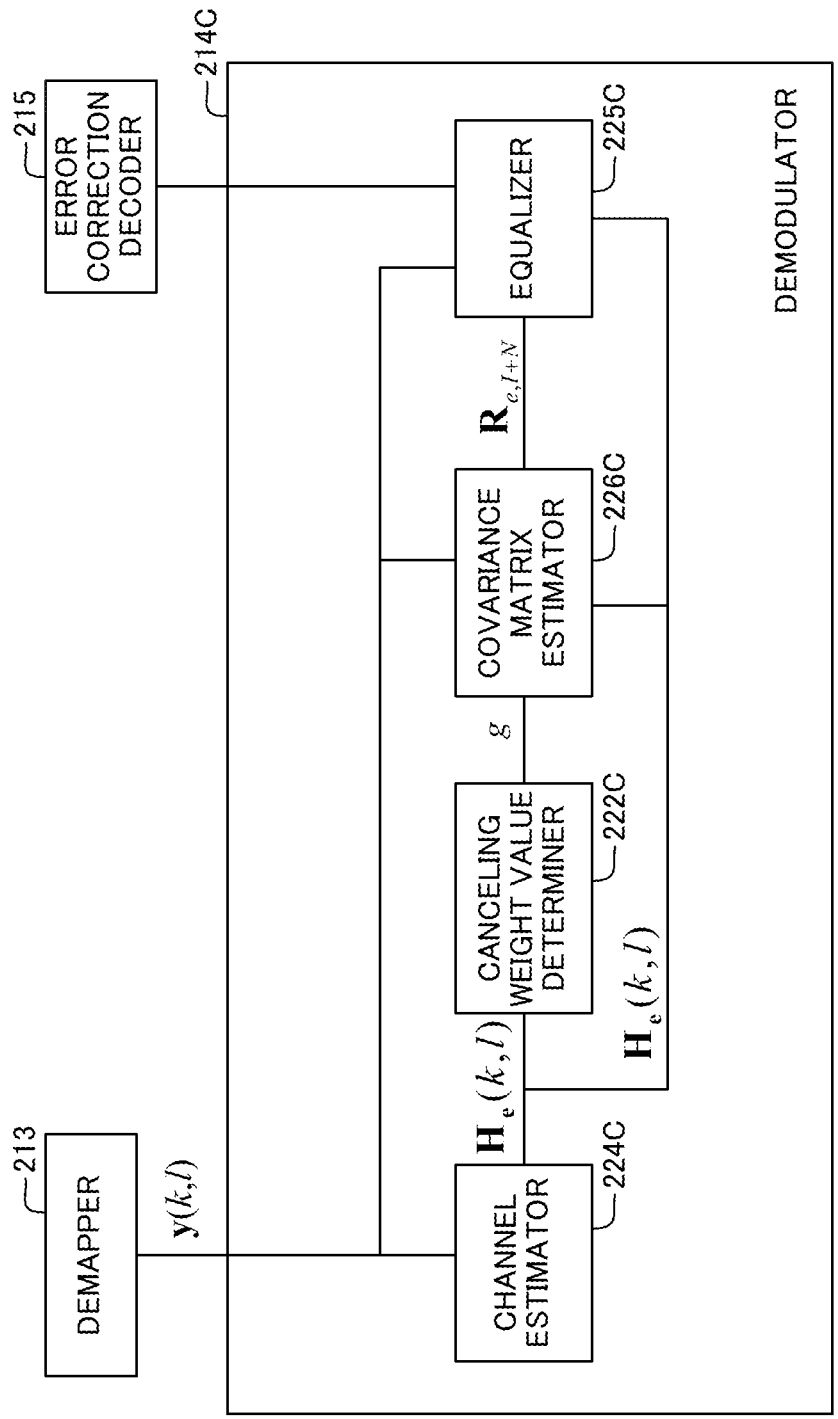
FIG. 16 is a block diagram illustrating an example of the function of a demodulator included in a mobile station according to a fourth embodiment.

As illustrated in FIG. 16, the demodulator 214C of the fourth embodiment carries out an Interference Rejection Combining (IRC) process, which estimates a covariance matrix for interference noise in the receiving signal on the basis of a signal obtained by subtracting the replica signal of the reference signal in the serving cell from the received signal.

In this embodiment, the demodulator 214C multiplies the replica signal by a weight value in the estimating of a covariance matrix. This makes it possible to estimate a precise covariance matrix, so that the quality of the wireless communication can be enhanced.

This embodiment assumes that the number of transmission antennas of the base station 10 is $N_t$ and the number of receiving antennas of the mobile station 20 is $N_r$. The symbols $N_t$ and $N_r$ represent each an integer equal to or more than one.

As illustrated in FIG. 16, the demodulator 214C exemplarily includes a channel estimator 224C, a canceling weight value determiner 222C, a covariance matrix estimator 226C, and an equalizer 225C. The channel estimator 224C is an example of the estimator; the canceling weight value determiner 222C is an example of the controller; and the covariance matrix estimator 226C is an example of the processor.

The channel estimator 224C estimates a channel between the base station 10 and the mobile station 20 in the serving cell on the basis of the received signal for an RE allocated to a CRS in the serving cell. The estimated value $H_e(k, l)$ of the channel is expressed by an $N_r \times N_t$ matrix. The element of this matrix in the a-th row and the b-th column represents an estimated value of the channel between the b-th transmitting antenna of the base station 10 and the a-th receiving antenna of the mobile station 20. The symbol a represents an integer of from one to $N_r$ and the symbol b represents an integer of from one to $N_t$.

The canceling weight value determiner 222C calculates a weight value g based on the estimated value $H_e$ of the channel estimated by the channel estimator 224C. The weight value g is an example of the first weight value.

In this embodiment, the canceling weight value determiner 222C estimates an error of the estimated value of the channel of the serving cell using Expression 34 likewise the first embodiment. Here, the term $m_{a,b}$ represents an estimation error of the estimated value of the channel between the b-th transmitting antenna of the base station 10 and the a-th receiving antenna of the mobile station 20 in the serving cell. The term $h_{e,a,b}(k, l)$ represents an element of the a-th row and the b-th column in the matrix $H_e(k, l)$.

$$E\{|m_{a,b}|^2\} = \frac{1}{2}E\{|h_{e,a,b}(k, l) - h_{e,a,b}(k + \Delta k, l)|^2\} \quad \text{[Expression 34]}$$

The canceling weight value determiner 222C calculates the weight value $g_{a,b}$ based on the estimation error $E\{|m_{a,b}|^2\}$ and the estimated value $H_e$ of the channel estimated by the channel estimator 224C. The canceling weight value determiner 222C calculates the weight value $g_{a,b}$ using Expression 35.

$$g_{a,b} = \frac{1}{1 + E\{|m_{a,b}|^2\}/(|h_{e,a,b}|^2 - E\{|m_{a,b}|^2\})} \quad \text{[Expression 35]}$$

Alternatively, the canceling weight value determiner 222C may determine the weight value along the manner of the second or the third embodiment in place of the manner of the first embodiment.

The covariance matrix estimator 226C estimates a covariance matrix $R_{e,I+N}$ for the interference noise on the basis of the received signal y input into the demodulator 214C, the estimated value $H_e$ of the channel estimated by the channel estimator 224C, and the calculated weight value $g_{a,b}$ using Expression 36. In Expression 36, the term Z represents a matrix having an element $g_{a,b}h_{e,a,b}(k, l)$ of the a-th row and the b-th column.

$$R_{e,I+N} = E[(y(k,l) - Z(k,l)x_{RS}(k,l))(y(k,l) - Z(k,l)x_{RS}(k,l))^H] \quad \text{[Expression 36]}$$

The term y(k, l) represents a received signal for the RE of l-th symbol time among REs of the k-th subcarrier. In this embodiment, the term y(k, l) is expressed in a column vector having $N_r$ elements. The element of the a-th row of this column vector represents the received signal for the a-th receiving antenna of the mobile station 20.

The term $x_{RS}(k, l)$ represents a reference signal (in this embodiment, CRS) transmitted in the RE of the l-th symbol time among REs of the k-th subcarrier in the serving cell. In this embodiment, the term $x_{RS}(k, l)$ is expressed in a column vector having $N_t$ elements. The element of the b-th row of this column vector represents the reference signal transmitted from the b-th transmitting antenna of the base station 10.

In this embodiment, the covariance matrix $R_{e,I+N}$ is represented by an $N_r \times N_r$ matrix.

Here, the symbols k and l represent the subcarrier number and the symbol time number of an RE belonging to an RE group consisting of REs forming a certain target range.

The target range of this embodiment is a group of REs to which CRSs are allocated in the serving cell among REs included in a single RB. In this embodiment, the covariance matrix estimator 226C estimates a covariance matrix for each RB.

Alternatively, the target range may be a group of REs to which CRSs are allocated in the serving cell among REs included in multiple RBs or may be a group of REs to which CRSs are allocated in the serving cell among REs included in the entire system band. The covariance matrix estimator 226C may use any target range. Alternatively, the covariance matrix estimator 226C may adaptively change the target range on the basis of information that indicates the state of communication, such as the Doppler frequency or the delay spread.

In this embodiment, the covariance matrix estimator 226C calculates a replica signal $H_e(k, l)x_{RS}(k, l)$ being the product of an estimated value $H_e(k, l)$ of a channel and the reference signal $x_{RS}(k, l)$ for each combination of k and l. Furthermore, the covariance matrix estimator 226C calculates the product of a signal obtained by subtracting a signal obtained by multiplying the replica signal $H_e(k, l)x_{RS}(k, l)$ by the weight value g from the received wireless signal y(k, l) and the Hermitian conjugate of the signal obtained by the subtraction for each combination of k and l. Furthermore, the covariance matrix estimator 226C averages the calculated products over the target range and thereby estimates the covariance matrix.

The replica signal $H_e(k, l)x_{RS}(k, l)$ may be an estimated value of a component derived from a reference signal $x_{RS}(k, l)$ in the serving cell contained in the received wireless signal y(k, l).

The equalizer 225C equalizes the received signal on the basis of the $H_e$ estimated by the channel estimator 224C, the covariance matrix $R_{e,I+N}$ estimated by the covariance matrix estimator 226C, and the received signal y using Expression 37. The symbol z represents the received signal after undergoing the equalization. Then the equalizer 225C calculates an LLR for soft-decision decoding on the basis of the received signal z after undergoing the equalization.

$$z(k,l) = H_e(k,l)R_{e,I+N}^{-1}y(k,l) \quad \text{[Expression 37]}$$

As described above, the mobile station 20 of the fourth embodiment estimates a channel for a known signal transmitted in a serving cell, which is a wireless area where a desired signal is transmitted, and determines the weight value g that is to be multiplied by the replica signal of the known signal on the basis of the estimated channel.

Accordingly, a component derived from a known signal transmitted in a wireless area where a desired signal is transmitted can be canceled form the received signal with satisfactorily high precision. Consequently, the information (in this embodiment, covariance matrix) related to interference noise containing an interfering wave and noise can be estimated with high precision, and the received signal can be appropriately processed, so that the quality of the wireless signal can be enhanced.

Additional embodiments and modifications can be further suggested by combining the above embodiments.

In the above embodiments, the apparatuses and the methods are applied to a CRS, but alternatively the apparatuses and the methods may be applied to a reference signal, a synchronization signal, and broadcast information, which are different from a CRS.

In the above embodiments, the apparatuses and the methods are applied to the downlink communication, but the apparatuses and the methods may be applied to uplink communication in place of or in addition to the downlink communication.

As an aspect, the quality of wireless communication can be enhanced.

All examples and conditional language provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A receiving apparatus comprising:
   an estimator that estimates a channel of a known signal received in the receiving apparatus;
   a controller that controls a weight value based on the result of the estimating, the weight value being multiplied by a replica signal of the known signal, the replica signal being obtained by multiplying the estimated channel of the known signal by the known signal, the weight value g being expressed by $$g = \frac{1}{1 + E\{|m|^2\}/(|h_e|^2 - E\{|m|^2\})},$$

where m represents an estimation error of the channel, $h_e$ represents the estimated channel, and $E\{X\}$ represents an average of variable X; and
   a processor that processes a received desired signal by subtracting the product of the weight value and the replica signal from the received desired signal.

2. The receiving apparatus according to claim 1, wherein the controller determines the weight value such that the received desired signal after being demodulated has a maximum signal-to-interference-pulse-noise ratio.

3. The receiving apparatus according to claim 1, wherein the known signal is transmitted in a wireless area different from a wireless area where the desired signal is transmitted.

4. The receiving apparatus according to claim 1, wherein the known signal is transmitted in a same wireless area where the desired signal is transmitted.

5. A method for receiving comprising:
   estimating, by a receiving apparatus, a channel of a received known signal;
   controlling, by the receiving apparatus, a weight value based on the result of the estimating, the weight value being multiplied by a replica signal of the known signal, the replica signal being obtained by multiplying the estimated channel of the known signal by the known signal, the weight value g being expressed by $$g = \frac{1}{1 + E\{|m|^2\}/(|h_e|^2 - E\{|m|^2\})},$$

where m represents an estimation error of the channel, $h_e$ represents the estimated channel, and $E\{X\}$ represents an average of variable X; and
   processing, by the receiving apparatus, a received desired signal by subtracting the product of the weight value and the replica signal from the received desired signal.

6. The method according to claim 5, further comprising:
   determining the weight value such that the received desired signal after being demodulated has a maximum signal-to-interference-pulse-noise ratio.

7. A wireless communication system comprising:
   a transmitting apparatus that transmits a desired signal; and
   a receiving apparatus that receives the desired signal, the receiving apparatus comprises:
     an estimator that estimates a channel of a known signal received in the receiving apparatus;
     a controller that controls a weight value based on the result of the estimating, the weight value being multiplied by a replica signal of the known signal, the replica signal being obtained by multiplying the estimated channel of the known signal by the known signal, the weight value g being expressed by $$g = \frac{1}{1 + E\{|m|^2\}/(|h_e|^2 - E\{|m|^2\})},$$

where m represents an estimation error of the channel, $h_e$ represents the estimated channel, and $E\{X\}$ represents an average of variable X; and
   a processor that processes the received desired signal by subtracting the product of the weight value and the replica signal from the received desired signal.

8. A receiving apparatus comprising:
   an estimator that estimates a channel of a known signal, which is transmitted using each of resource elements, received in the receiving apparatus based on the known signal for each of the resource elements and respective coefficients for the resource elements;
   a controller that controls a weight value based on the result of the estimating, the weight value being multiplied by a replica signal of the known signal, the replica signal being obtained by multiplying the estimated channel of the known signal by the known signal, the weight value $g_i(p)$ for p-th element among the resource elements being expressed by $$g_i(p) = \frac{E[|x_i^{(CRS)}|^2]\sum_{q=1}^{N_{RS}} E[h_i(p)h_i^*(q)]w^*(q) + w^*(p)\sigma^2}{E[h_{e,i}(p)h_{e,i}^*(p)]},$$

where $N_{RS}$ represents a number of the resource elements, $x_i^{(CRS)}$ represents the known signal, w(p) represents the coefficient for the p-th element among the resource elements, $h_i(p)$ represents the channel for the p-th element among the resource elements, $h_{e,i}(p)$ represents the estimated channel for the p-th element among the resource elements, $\sigma^2$ represents a variance of noise, $E\{X\}$ represents an average of variable X, and X* represents a complex conjugate of a value X; and
   a processor that processes a received desired signal by subtracting the product of the weight value and the replica signal from the received desired signal.

* * * * *